(12) United States Patent
Yokota et al.

(10) Patent No.: US 6,748,485 B1
(45) Date of Patent: Jun. 8, 2004

(54) RECORDING MEDIUM, RECORDING APPARATUS AND RECORDING/ REPRODUCING SYSTEM FOR TRACKING USE AND TRANSFER OF DATA

(75) Inventors: Teppei Yokota, Chiba (JP); Nobuyuki Kihara, Tokyo (JP)

(73) Assignee: Sony Corporation, Tokyo (JP)

( * ) Notice: Subject to any disclaimer, the term of this patent is extended or adjusted under 35 U.S.C. 154(b) by 504 days.

(21) Appl. No.: 09/692,398

(22) Filed: Oct. 19, 2000

(30) Foreign Application Priority Data

Oct. 26, 1999 (JP) .......................................... P11-303746

(51) Int. Cl.[7] .............................................. G06F 13/00
(52) U.S. Cl. ........................... 711/112; 705/51; 705/57; 380/201; 386/94
(58) Field of Search ..................... 711/112; 380/201; 386/94; 705/51, 57

(56) References Cited

U.S. PATENT DOCUMENTS

| | | | |
|---|---|---|---|
| 5,095,422 A | 3/1992 | Horiguchi | ................... 711/201 |
| 5,822,533 A | 10/1998 | Saito et al. | .................. 709/224 |
| 5,864,679 A | 1/1999 | Kanai et al. | ................. 709/238 |
| 6,108,423 A * | 8/2000 | Sako et al. | .................. 380/203 |
| 6,163,779 A * | 12/2000 | Mantha et al. | .............. 707/100 |
| 6,282,653 B1 * | 8/2001 | Berstis et al. | ................ 713/200 |

\* cited by examiner

*Primary Examiner*—Reba I. Elmore
(74) *Attorney, Agent, or Firm*—Frommer Lawrence & Haug LLP; William S. Frommer; Gordon Kessler

(57) ABSTRACT

A storage medium, an apparatus, a system and a method for writing data to and reproducing data from storage medium is provided. The storage medium comprises a data area for storing data and a management area for storing management data corresponding to data stored in the data area. The management data stored in the management area comprises identification information identifying a route followed by the data stored in the data area in arriving in the data area. The apparatus comprises a data recorder for writing a received data into a data area and an identification information recorder for recording identification information into a management area. The identification information identifies a route followed by the data written to the data area in arriving in the data area.

63 Claims, 30 Drawing Sheets

FILE SYSTEM
PROCESSING HIERARCHY

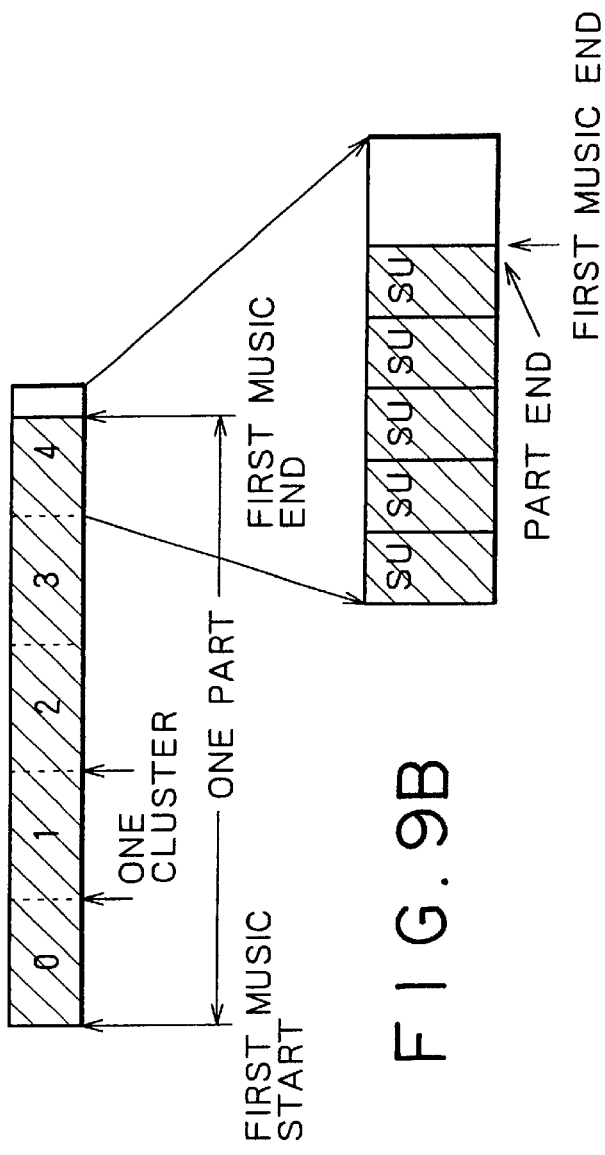
FIG. 9A
FIG. 9B
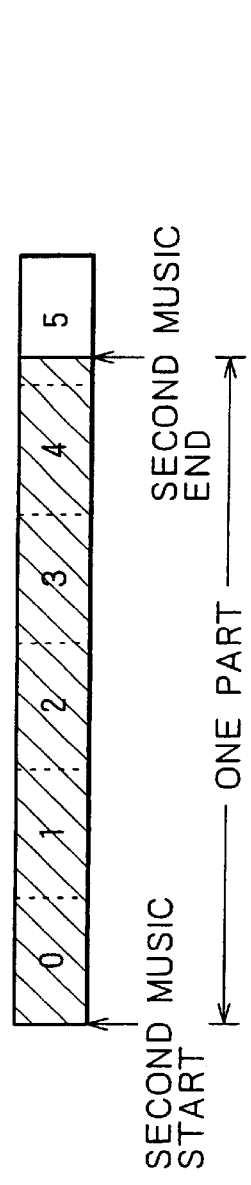
FIG. 9C

FIG. 12
REPRODUCTION MANAGEMENT FILE (PBLIST)

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| HEADER 0x0000 | BLKID-TL0 | | | | Reserved | | MCode | | REVISION | | | | Reserved | | | |
| 0x0010 | SN1C+L | | SN2C-L | | SINFSIZE | | T-TRK | VerNo | | | Reserved | | | | | |
| 0x0020 | NM1-S (256) | | | | | | | | | | | | | | | |
| 0x0120 | NM2-S (512) | | | | | | | | | | | | | | | |
| 0x0320 | Reserved | | | | | | | | | CONTENTS KEY | | | | | | |
| 0x0330 | Reserved | | | | | | | | | MAC | | | | | | |
| | Reserved | | | | | | | | | | | | | S-YMDhms | | |
| TRKTBL 0x0350 | TRK-001 | TRK-002 | | TRK-003 | | TRK-004 | | TRK-005 | | TRK-006 | | TRK-007 | | TRK-008 | | |
| | TRK-009 | TRK-010 | | TRK-011 | | TRK-012 | | TRK-013 | | TRK-014 | | TRK-015 | | TRK-016 | | |
| | ... | | | | | | | | | | | | | | | |
| | TRK-393 | TRK-394 | | TRK-395 | | TRK-396 | | TRK-397 | | TRK-398 | | TRK-399 | | TRK-400 | | |
| 0x0660 | | | | | | | | | | | | | | | | |
| 0x0647 | INF-S (14720) | | | | | | | | | | | | | | | |
| 0x3FF0 | BLKID-TL0 | | | | Reserved | | MCode | | REVISION | | | | Reserved | | | |

FIG. 13

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| INF | 0x00 | ID | 0x00 | SIZE | | MCode | | C+L | | Reserved | | DATA VARIABLE LENGTH | | | |

ADDITIONAL INFORMATION DATA (INF-S)

FIG. 14

ADDITIONAL INFORMATION KEY CODES

| ID | MUSIC (CHARACTER) |  | ID | URL (WEB) |  |
|---|---|---|---|---|---|
| 0 | RESERVED |  | 32 | RESERVED |  |
| 1 | ALBUM | VARIABLE | 33 | ALBUM | VARIABLE |
| 2 | SUBTITLE | VARIABLE | 34 | SUBTITLE | VARIABLE |
| 3 | ARTIST | VARIABLE | 35 | ARTIST | VARIABLE |
| 4 | CONDUCTOR | VARIABLE | 36 | CONDUCTOR | VARIABLE |
| 5 | ORCHESTRA | VARIABLE | 37 | ORCHESTRA | VARIABLE |
| 6 | PRODUCER | VARIABLE | 38 | PRODUCER | VARIABLE |
| 7 | PUBLICATION/PUBLISHER | VARIABLE | 39 | PUBLICATION/PUBLISHER | VARIABLE |
| 8 | COMPOSER | VARIABLE | 40 | COMPOSER | VARIABLE |
| 9 | SONG WRITER | VARIABLE | 41 | SONG WRITER | VARIABLE |
| 10 | ADAPTER | VARIABLE | 42 | ADAPTER | VARIABLE |
| 11 | SPONSOR | VARIABLE | 43 | SPONSOR | VARIABLE |
| 12 | CM | VARIABLE | 44 | CM | VARIABLE |
| 13 | DESCRIPTION | VARIABLE | 45 | DESCRIPTION | VARIABLE |
| 14 | ORIGINAL TITLE NAME | VARIABLE | 46 | ORIGINAL TITLE NAME | VARIABLE |
| 15 | ORIGINAL ALBUM NAME | VARIABLE | 47 | ORIGINAL ALBUM NAME | VARIABLE |
| 16 | ORIGINAL COMPOSER | VARIABLE | 48 | ORIGINAL COMPOSER | VARIABLE |
| 17 | ORIGINAL SONG WRITER | VARIABLE | 49 | ORIGINAL SONG WRITER | VARIABLE |
| 18 | ORIGINAL ADAPTER | VARIABLE | 50 | ORIGINAL ADAPTER | VARIABLE |
| 19 | ORIGINAL PLAYER | VARIABLE | 51 | ORIGINAL PLAYER | VARIABLE |
| 20 | MESSAGE | VARIABLE | 52 |  |  |
| 21 | COMMENT | VARIABLE | 53 |  |  |
| 22 | WARNING | VARIABLE | 54 |  |  |
| 23 | GENRE | VARIABLE | 55 |  |  |
| 24 | TEXT | VARIABLE | 56 |  |  |
| 25 |  |  | 57 |  |  |
| 26 |  |  | 58 |  |  |
| 27 |  |  | 59 |  |  |
| 28 |  |  | 60 |  |  |
| 29 |  |  | 61 |  |  |
| 30 |  |  | 62 |  |  |
| 31 |  |  | 63 |  |  |

FIG. 15

ADDITIONAL INFORMATION KEY CODES

| ID | PATH/OTHERS | | ID | CONTROL/NUMERIC DATA | |
|---|---|---|---|---|---|
| 64 | RESERVED | | 96 | RESERVED | |
| 65 | PATH TO IMAGE DATA | VARIABLE | 97 | ISRC | 8 |
| 66 | PATH TO LYRICS DATA | VARIABLE | 98 | TOC-ID | 8 |
| 67 | PATH TO MIDI DATA | VARIABLE | 99 | UPC/JAN | 7 |
| 68 | PATH TO DESCRIPTION DATA | VARIABLE | 100 | RECORDING DATE (YMDhms) | 4 |
| 69 | PATH TO COMMENT DATA | VARIABLE | 101 | RELEASE DATE (YMDhms) | 4 |
| 70 | PATH TO CM DATA | VARIABLE | 102 | ORIGINAL RELEASE DATE (YMDhms) | 4 |
| 71 | PATH TO FAX DATA | VARIABLE | 103 | RECORDING DATE (YMDhms) | 4 |
| 72 | PATH TO COMMUNICATION DATA 1 | VARIABLE | 104 | SUB TRACK | 4 |
| 73 | PATH TO COMMUNICATION DATA 2 | VARIABLE | 105 | AVERAGE VOLUME | 1 |
| 74 | PATH TO CONTROL DATA | VARIABLE | 106 | RESUME | 4 |
| 75 | | | 107 | REPRODUCTION LOG (YMDhms) | 4 |
| 76 | | | 108 | REPRODUCTION COUNT (FOR LEARNING) | 1 |
| 77 | | | 109 | PASSWORD 1 | 16 |
| 78 | | | 110 | APP LEVEL | 16 |
| 79 | | | 111 | GENRE CODE | 2 |
| 80 | | | 112 | MIDI DATA | VARIABLE |
| 81 | PART ADDITIONAL INFORMATION | VARIABLE | 113 | THUMBNAIL PHOTO DATA | VARIABLE |
| 82 | | | 114 | CHARACTER BROADCAST DATA | VARIABLE |
| 83 | | | 115 | TOTAL NUMBER OF MUSIC | 2 |
| 84 | | | 116 | SET NUMBER | 1 |
| 85 | | | 117 | TOTAL NUMBER OF SET NUMBERS | 1 |
| 86 | | | 118 | REC POSITION INFORMATION-GPS | VARIABLE |
| 87 | | | 119 | PB POSITION INFORMATION-GPS | VARIABLE |
| 88 | | | 120 | REC POSITION INFORMATION-PHS | VARIABLE |
| 89 | | | 121 | PB POSITION INFORMATION-PHS | VARIABLE |
| 90 | DISC-TOC | VARIABLE | 122 | DESTINATION TELEPHONE NUMBER 1 | VARIABLE |
| 91 | | | 123 | DESTINATION TELEPHONE NUMBER 2 | VARIABLE |
| 92 | | | 124 | INPUT VALUE | VARIABLE |
| 93 | | | 125 | OUTPUT VALUE | VARIABLE |
| 94 | | | 126 | PB CONTROL DATA | VARIABLE |
| 95 | | | 127 | REC CONTROL DATA | VARIABLE |

FIG. 16

ADDITIONAL INFORMATION KEY CODES

| ID | SYNC REPRODUCTION | |
|---|---|---|
| 128 | RESERVED | |
| 129 | SYNC REPRODUCTION 1 | VARIABLE |
| 130 | SYNC REPRODUCTION 2 | VARIABLE |
| 131 | SYNC REPRODUCTION 3 | VARIABLE |
| 132 | SYNC REPRODUCTION 4 | VARIABLE |
| 133 | SYNC REPRODUCTION 5 | VARIABLE |
| 134 | SYNC REPRODUCTION 6 | VARIABLE |
| 135 | | |
| 136 | | |
| 137 | | |
| 138 | EMD 1 | VARIABLE |
| 139 | EMD 2 | VARIABLE |
| 140 | | |
| 141 | | |
| 142 | | |
| 143 | | |
| 144 | | |
| 145 | | |
| 146 | | |
| 147 | | |
| 148 | | |
| 149 | | |
| 150 | | |
| 151 | | |
| 152 | | |
| 153 | | |
| 154 | | |
| 155 | | |
| 156 | | |
| 157 | | |
| 158 | | |
| 159 | | |

FIG. 17A
| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | INF | 0x00 | ID | 0x00 | SIZE | | MCode | | C+L | | Reserved | | VARIABLE DATA | | | |
FIG. 17B
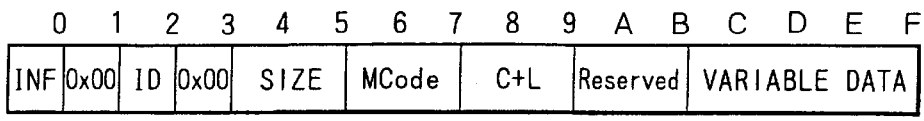
FIG. 17C
| SIZE | BINARY NO SETTING | | | | | ID | | ISRC | |
|---|---|---|---|---|---|---|---|---|---|
| | | | | | | 0x69 | 0x00 | 97 | 0x00 |
| 0x14(20) | MCode | 0x00 | 0x00 | 0x00 | 0x00 | ISRC Code 8Bytes | | | |
DATA
FIG. 17D
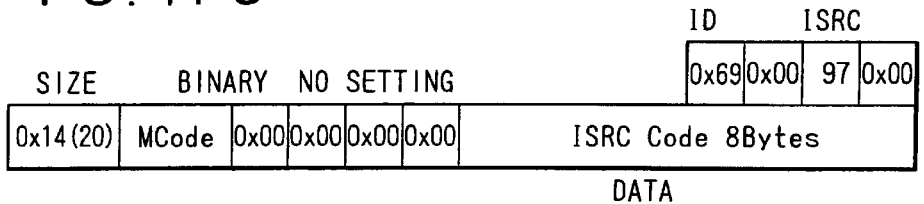
FIG. 17E
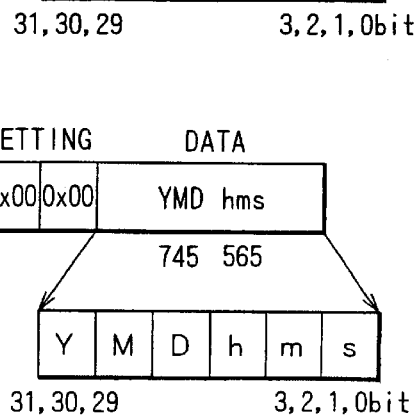

FIG.18

A3Dnnnn. MSA (ATRAC3 DATA FILE)

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 0x0000 | BLKID-HD0 | | | | Reserved | | MCode | | Reserved | | | | BLOCK SERIAL | | | | HEADER |
| 0x0010 | N1C+L | | N2C+L | | INFSIZE | | T-PRT | | T-SU | | | | INX | | XT | | |
| 0x0020 | NM1 (256) | | | | | | | | | | | | | | | | |
| 0x0120 | NM2 (512) | | | | | | | | | | | | | | | | BLOCK (ATTRIBUTE HEADER) |
| 0x0310 | | | | | | | | | | | | | | | | | |
| 0x0320 | Reserved (8) | | | | | | | | CONTENTS KEY | | | | | | | | TRKINF |
| | Reserved (8) | | | | | | | | C-MAC [n] | | | | | | | | |
| | Reserved (12) | | | | | | | | | | | A | LT | | FNo | | |
| | MG (D) SERIAL-nnn | | | | | | | | | | | | | | | | |
| 0x0360 | CONNUM | | | | YMDhms-S | | | | YMDhms-E | | | | MT | CT | CC | CN | |
| 0x0370 | PRTSIZE | | | | PRTKEY | | | | | | | | Reserved (8) | | | | PRTINF |
| 0x0380 | | | | | CONNUMO | | | | PRTSIZE(0x0388) | | | | PRTKEY | | | | |
| 0x0390 | | | | | Reserved (8) | | | | | | | | CONNUMO | | | | |
| | INF (0x0400) | | | | | | | | | | | | | | | | |
| 0x3FFF | BLKID-HD0 | | | | Reserved | | MCode | | Reserved | | | | BLOCK SERIAL | | | | |
| 0x4000 | BLKID-A3D | | | | Reserved | | MCode | | CONNUMO | | | | BLOCK SERIAL | | | | HEADER |
| 0x4010 | BLOCK SEED | | | | | | | | INITIALIZATION VECTOR | | | | | | | | |
| 0x4020 | SU-000 (Nbytes=384bytes) | | | | | | | | | | | | | | | | |
| 0x41A0 | SU-001 (Nbytes) | | | | | | | | | | | | | | | | |
| 0x4320 | SU-002 (Nbytes) | | | | | | | | | | | | | | | | BLOCK |
| 0x04A0 | SU-041 (Nbytes) | | | | | | | | | | | | | | | | |
| 0x7DA0 | | | | | | | | | | | | | | | | | |
| 0x7F20 | Reserved (Nbytes=208bytes) | | | | | | | | | | | | | | | | |
| | BLOCK SEED | | | | | | | | | | | | | | | | |
| 0x7FF0 | BLKID-A3D | | | | Reserved | | MCode | | CONNUMO | | | | BLOCK SERIAL | | | | |

FIG. 19

| BIT | MEANING | VALUE |
|---|---|---|
| 7 | ATRAC3 MODE | 0 : DUAL      1 : JOINT |
| 6<br>5<br>4 | RATE VALUE | N  DISPLAY  TIME    RATE      SU     BYTE<br>7  HQ       47min   176kbps   31SU   512<br>6  EX       58min   146kbps   38SU   424<br>5  EX       64min   132kbps   42SU   384<br>4  SP       81min   105kbps   53SU   304<br>3  LP       90min    94kbps   59SU   272<br>2  LP      128min    66kbps   84SU   192<br>1  MN      181min    47kbps  119SU   136<br>0  MN      258min    33kbps  169SU    96<br>(N IS VALUE OF 3 BITS 6, 5, AND 4)<br>* N=0, 1 MONAURAL SPECIFIES SPECIAL JOINT MODE OF ONLY MAIN SIGNAL WITH BIT 7 BEING "1" (JOINT). |
| 3 | RESERVED | — |
| 2 | DATA DIVISION | 0 : AUDIO     1 : OTHER |
| 1 | REPRODUCTION SKIP | 0 : NORMAL REPRODUCTION  1 : SKIP |
| 0 | EMPHASIS | 0 : OFF       1 : ON (50/15μs) |

| BIT | MEANING | | VALUE | |
|---|---|---|---|---|
| 7 | COPY CONTROL | COPY PROTECTED /ENABLED | 0: PROTECTED | 1: ENABLED |
| 6 | | GENERATION | 0: ORIGINAL | 1: 1ST OR HIGHER |
| 5 | HIGH-SPEED DIGITAL COPY CONTROL (HCMS) | | 00: COPY PROTECTED | 01: 1ST GENERATION |
| 4 | | | 10: COPY ENABLED | |
| 3 | COPY ATTRIBUTE | | 000: RESERVED | |
| 2 | | | 001: CONTENT RECORDED FROM ORIGINAL SOURCE | |
| | | | 010: CONTENT COPIED FROM LCM | |
| 1 | | | 011: CONTENT MOVED FROM LCM | |
| | | | 100 OR HIGHER: RESERVED | |
| 0 | RESERVED | | — | |

CC

LCM: LICENSED COMPLIANT MODULE
EXAMPLE: HDD, ETC. OF PC AND CONSUMER EQUIPMENT

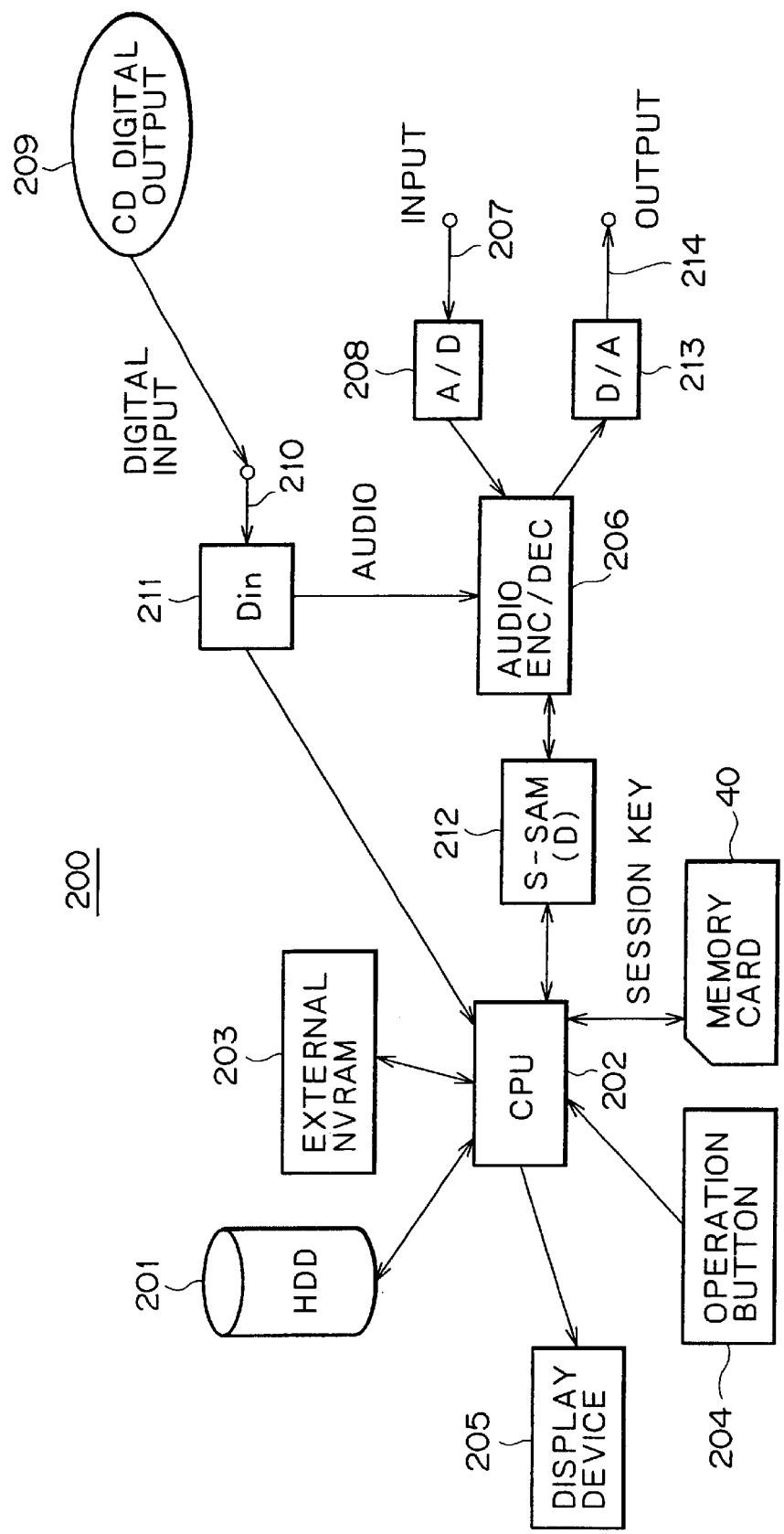

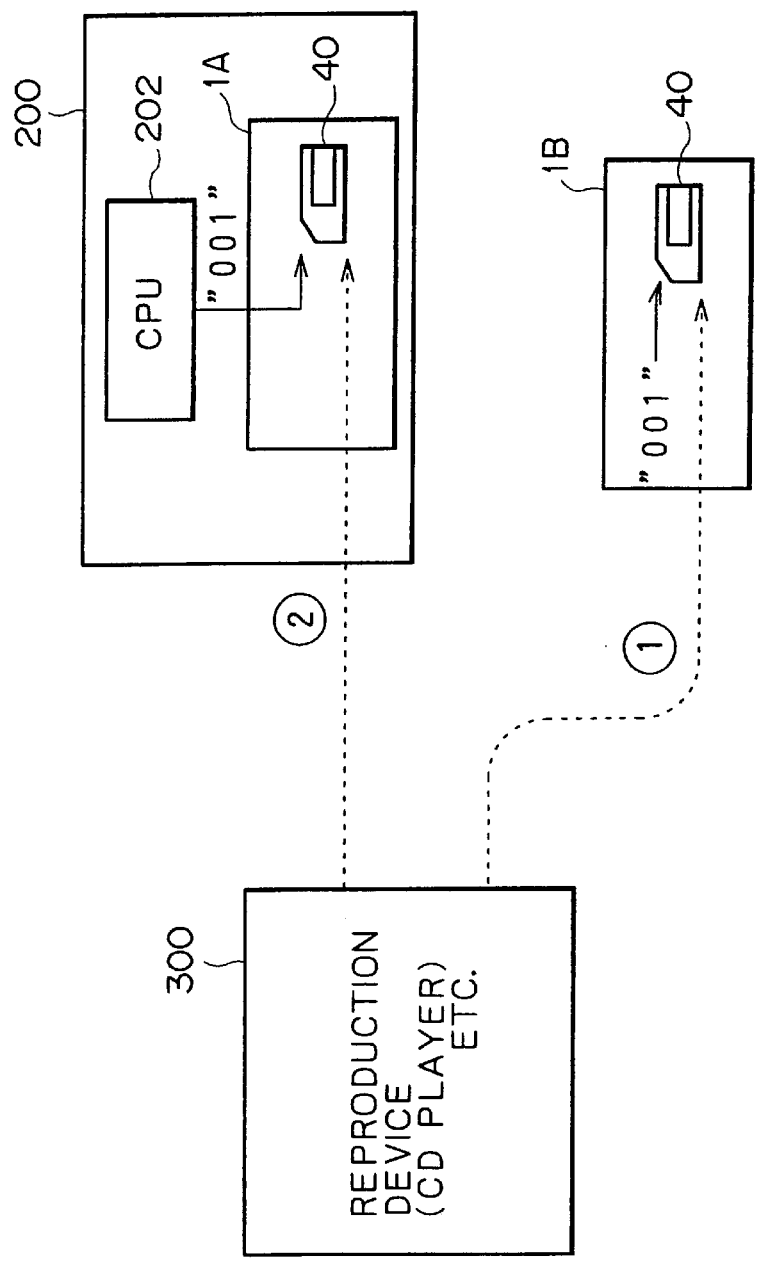

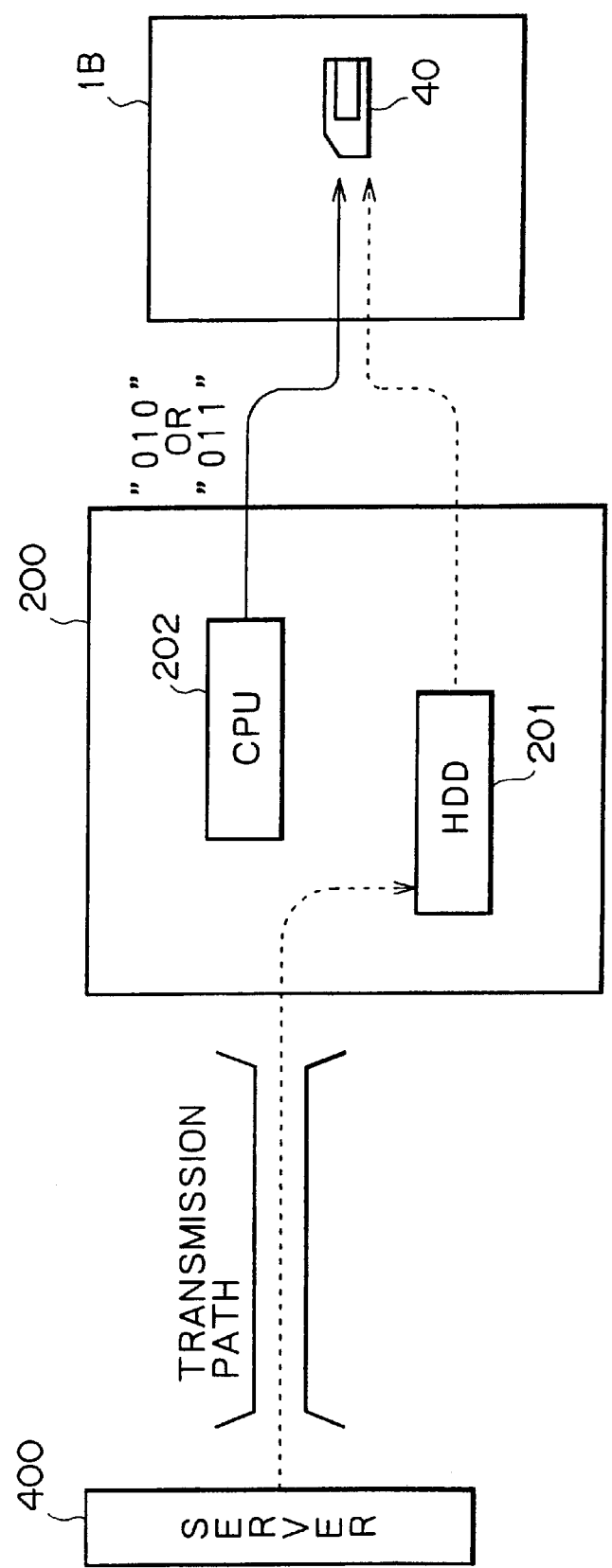
F I G. 24

RECORDING MEDIUM, RECORDING APPARATUS AND RECORDING/REPRODUCING SYSTEM FOR TRACKING USE AND TRANSFER OF DATA

BACKGROUND OF THE INVENTION

The present invention relates generally to a recording medium for recording content such as audio data and video data for example, a recording apparatus compliant with such a recording medium, and a recording/reproducing system compliant with such a recording medium, and also including a mass storage medium.

In an electrically erasable non-volatile memory called an EEPROM (Electrically Erasable Programmable ROM), one bit is configured by two transistors. This configuration requires a large occupancy area, thereby restricting the growth in integration density. To solve this problem, a flash memory has been developed in which one bit is realized by one transistor by erasing all bits at once. The flash memory is expected to replace such recording media as magnetic disc and optical disc.

A so-called memory card is known in which the flash memory is used and which is constructed to be detachably mounted on various electronic devices. Use of this memory card can realize digital audio data recording/reproducing apparatuses that use the memory card instead of conventional disc media such as CD (Compact Disc) and MD (Mini Disc).

With systems for recording/reproducing audio data and video data to and from a flash memory based memory card, content such as music may be copied from a recording medium such as a CD to such a memory card. The copied music may then be reproduced from the memory card in a memory-card based reproducing apparatus.

It is also possible to use a mass storage recording medium, such as a hard disc drive (HDD) incorporated in a personal computer for example, as a personal server for storing the music, and for transferring the music the a memory card when desired.

For example, content data stored in a CD or downloaded through the Internet may first be stored on the HDD of a personal computer. The stored content data may then be copied or moved into a memory card. A reproducing apparatus to which the memory card is coupled may then reproduce the content data stored in the memory card. When content data is copied from the HDD to the memory card a copy of the content data remains on the HDD. When content data is moved, the content data is copied from the HDD to a memory card, and then the content data is erased from the HDD (the source of the copy).

In order to protect and enforce copyright protection of the content data, it is desirable to restrict the copying and movement of content data to a certain degree. If free copying and movement of content data are permitted, extensive copyright infringement is likely. On the other hand, from the viewpoint of content users, complete prohibition on procedures for copying or moving content data impairs many of the benefits of being able to transfer and use content data on a number of devices.

Therefore, it is desirable to provide a system including an appropriate management of content data copying and movement operations to ensure the ability to make personal copies of content data by a legitimate user, while protecting the copyrights of the content data.

OBJECTS OF THE INVENTION

It is therefore an object of the present invention to provide a method an apparatus that insures a proper management of copy and move operations of content data between recording media.

Another object of the invention is to provide a method and apparatus for ensuring the ability to make personal copies of content data by a legitimate user, while protecting the copyrights of the content data.

A further object of the invention is to provide a method and apparatus for controlling the number of copies of a particular content data are permitted to be made.

Still another object of the invention is to provide a method and apparatus for monitoring copy and move operations performed from a single content data source.

Still other objects and advantages of the invention will in part be obvious and will in part be apparent from the specification and the drawings.

SUMMARY OF THE INVENTION

In accordance with the invention there is provided a recording medium having a data area for storing content data and a management area for storing management data. The management data is used to manage the data stored in the data area. The management data identifies the path through which the content data has traveled before being stored in the data area. This recording medium may comprise a non-volatile memory or a mass storage medium such as a hard disc drive, for example. The management data further identifies whether the content data stored in the recording medium has been copied or moved to or from another mass storage medium or non-volatile memory.

A recording apparatus compatible with the recording medium is also provided. The recording apparatus comprises a content data recorder for recording transferred content into the content data recording area and a management information recorder for recording management information into the management area. The management information is indicative a source of the content data. The management information identifies a distinction between a first case in which the stored content data is directly transferred from the original source, and a second case in which the stored content data is recorded in an intermediate storage device, such as a mass storage medium, before being stored in the content data recording area. The recording apparatus further comprises a controller for controlling any further copying or moving of the recorded content data based upon the management information. The recording apparatus still further comprises a management information updating apparatus for updating a value of the management data if the content data is copied to or from another storage medium, such as a mass storage medium.

According to the invention, copy and move operations for moving data to and from a recording medium can be enabled or disabled based upon the source of the data, and the type of recording medium.

More specifically, in accordance with the invention, if content recorded in the content data recording area of a recording medium is to have been copied from a mass storage recording medium, this content may be moved only to the mass storage recording medium from which it has been copied, thereby disabling any other copy and move operations. Further, if the content data has been directly transferred from a recording medium of a predetermined type onto a mass storage recording medium (i.e. the content exists on both the recording medium of the predetermined type and the mass storage recording medium at the same time), the management information is updated to be equivalent to management data in the case that the content data has been transferred from the mass storage recording medium to the recording medium of the predetermined type, thereby disabling any further copy and move operations. Still further, as for the content data recorded in the mass storage recording medium, a copy permission count controller can properly disable the copying of the content data from the mass storage recording medium to the recording medium of the predetermined type if a predetermined number of copies have already been made.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIGS. 9A, 9B, and 9C are diagrams illustrating configurations of the data file of the embodiment;

FIG. 12 is a diagram illustrating a configuration of the reproduction management file of the embodiment;

FIG. 13 is a diagram illustrating a configuration of an additional information area of the reproduction management file of the embodiment;

FIG. 14 is a diagram illustrating additional information key codes of the embodiment;

FIG. 15 is a diagram illustrating other additional information key codes of the embodiment;

FIG. 16 is a diagram illustrating still other additional information key codes of the embodiment;

FIGS. 17A, 17B, 17C, 17D, and 17E are diagrams illustrating specific data configurations of additional information of the embodiment;

FIG. 18 is a diagram illustrating a configuration of the data file of the embodiment;

FIG. 19 is a diagram illustrating "A" of an attribute head of the data file of the embodiment;

FIG. 20 is a diagram illustrating "CC" of the attribute header of the data file of the embodiment;

FIG. 21 is a block diagram illustrating an apparatus having a hard disc drive of the embodiment.

FIG. 22 is a diagram illustrating an example of recording routes to the memory card of the embodiment;

FIG. 24 is a diagram illustrating still another example of recording routes to the memory card of the embodiment;

DETAILED DESCRIPTION OF THE PREFERRED EMBODIMENTS

Figure 1:
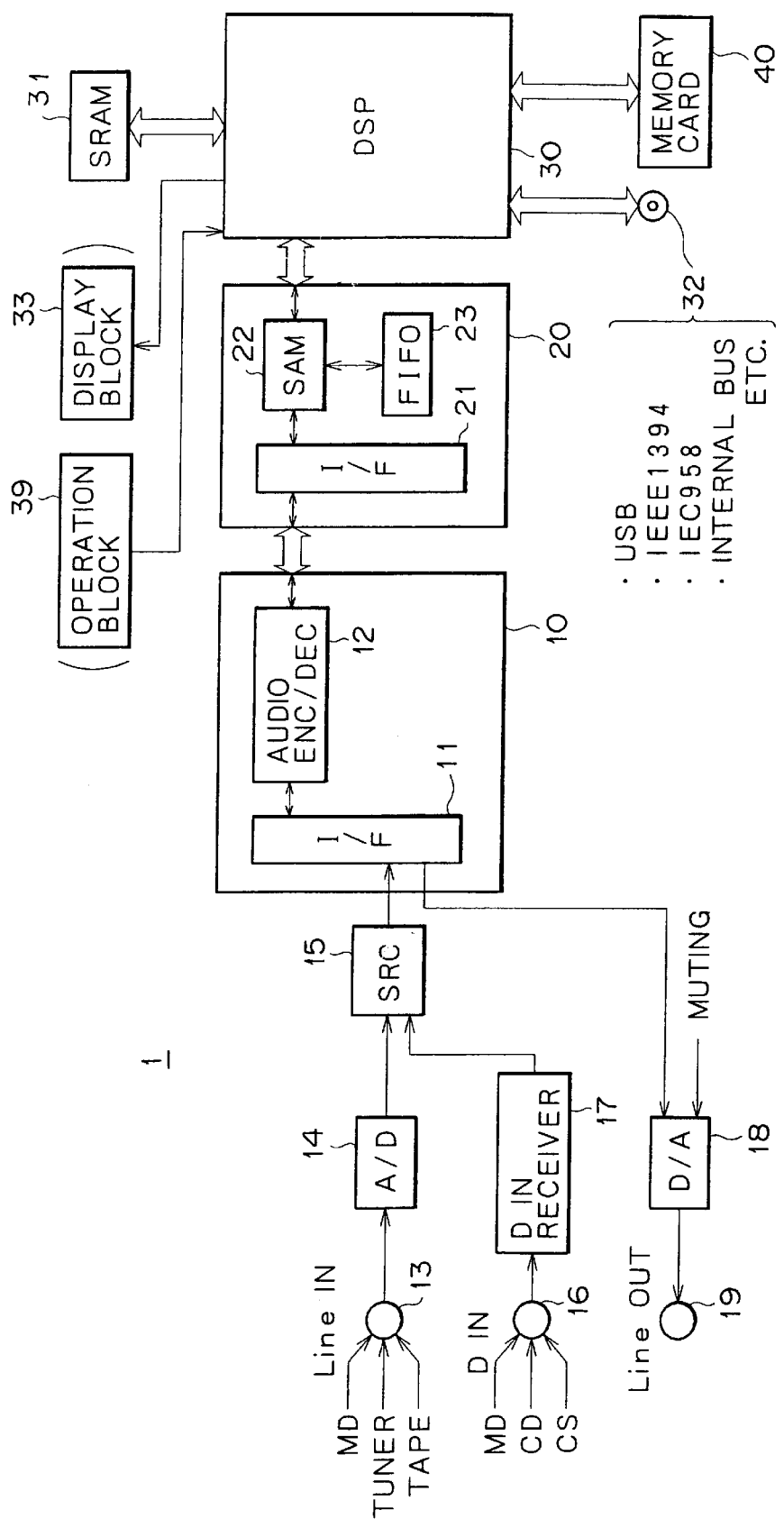
FIG. 1 is a block diagram illustrating a recorder practiced as one embodiment of the invention.

This invention will be described in further detail by way of example with reference to the accompanying drawings. In accordance the first embodiment of the invention, a memory card including a nonvolatile memory (a flash memory) as a recording medium will described. A recorder capable of recording data to and reproducing data from the memory card will also be described. A recording/reproducing system comprising a recorder capable of recording data to and reproducing data from the memory card and a personal computer will be described.

Content data that can be handled in accordance with the invention includes audio data, video data such as moving picture data and still picture data, text data, and program data, by way of example only. For the purpose of this description, audio music data will be described. The audio data can be recorded/reproduced by use of additional information such as images and characters, in addition to digital audio signals.

The following description will be made in the order as shown:

1. Configuration of recorder
2. Configuration of memory card
3. File system
   3-1 Processing structure and data structure
   3-2 Configuration of directory
   3-3 Management structure and editing scheme
   3-4 Reproduction management file
   3-5 Data file
4. Configuration of device having HDD
5. Various recording paths to memory card and identification information of content supply source 6. Processing for copy and move operations
7. Examples of copy and move operations
1. Configuration of recorder Now, referring to FIG. 1, the following describes the configuration of a memory card recording/reproducing apparatus (hereafter referred to as a recorder 1) capable of recording and reproducing content such as audio data on a memory card.

The recorder 1 uses a detachable memory card as its recording medium. The recorder 1 may be configured as a stand-alone audio device or as an incorporated component in a personal computer or an audio/visual device.

In the stand-alone configuration, the recorder 1 is a floor-type recording/reproducing apparatus or a portable, small-size recording/reproducing apparatus. In this case, the recorder 1 may be configured into an audio system along with an amplifier, a speaker, a CD player, an MD recorder, a tuner, and so on.

In the incorporated configuration, the recorder 1 may be employed as a memory card drive in the same positioning as a CD-ROM drive and a floppy disc drive for example in a personal computer.

Further, the recorder 1 may be incorporated in a video camera or a game machine to use the memory card as a recording medium for video data and audio data.

Still further, regardless of the stand-alone configuration and the incorporated configuration, the recorder 1 is applicable as a recorder for recording digital audio signals and so on distributed through satellite-based data communication, digital broadcasting, or the Internet.

FIG. 1 shows a generation configuration of the recorder 1 as a memory card recording/reproducing apparatus that can be realized in the above-mentioned various forms.

The recorder 1 has an audio encoder/decoder IC 10, a security IC 20, and a DSP (Digital Signal Processor) 30, each being configured by one IC chip. A memory card 40 is detachably mounted on the recorder 1.

The memory card 40 is formed by a flash memory (a nonvolatile memory), a memory control block, and a security block including a DES (Data Encryption Standard) encryption circuit, all arranged on one IC chip.

In this example, the DSP 30 is used. It will be apparent that, instead of the DSP 30, a microcomputer an equivalent capability may be used.

The audio encoder/decoder IC 10 has an audio interface 11 and an encoder/decoder block 12. The encoder/decoder block 12 highly efficiently encodes a digital signal so that it is written to the memory card 40 and decodes the data read from the memory 40. For the high efficiency encoding, improved ATRAC (Adaptive Transform Acoustic Coding) referred to as ATRAC3 as used for the Mini Disc is used.

In ATRAC3, audio data which are 16 bits wide per sample as sampled by 44.1 KHz are processed. The minimum data unit in which audio data are processed by ATRAC3 is sound unit SU. One SU is 1,024 samples of data (1,024×16 bits×2 channels) compressed into several hundred bytes, about 23 ms in time. Audio data are compressed by ATRAC3 into about 1/10 of the original data. As with the Mini Disc, the well-worked out signal processing of ATRAC3 minimizes the deterioration of tone quality due to the compression and decompression processing.

A line input selector 13 selectively supplies an MD reproduction output, a tuner output, and a tape reproduction output to an A/D converter 14. The A/D converter 14 converts a selected line input signal into a digital audio signal (sampling frequency=44.1 KHz, 1 sample=16 bits).

A digital input selector 16 selectively supplies MD, CD, and CS (satellite digital broadcast) to a digital input receiver 17. Digital inputs are transmitted through an optical cable for example. An output of the digital input receiver 17 is supplied to a sampling rate converter 15, in which the sampling frequency of the digital input is converted into 44.1 KHz.

The encoded data obtained by the encoding in he encoder/decoder block 12 of the audio encoder/decoder IC 10 are supplied to the DES encryption circuit 22 through an interface 21 of the security IC 20.

The DES encryption circuit 22 has a FIFO 23. The DES encryption circuit 22 is provided to protect the copyright of content.

The memory card 40 also incorporates a DES encryption circuit, which will be described later.

The DES encryption circuit 22 of the recorder 1 has two or more master keys and a device-unique storage key. In addition, the DES encryption circuit 22 has a random number generator to share authentication and session keys with the memory card 40 incorporating a DES encryption circuit. The DES encryption circuit 22 can turn on the key again by the storage key through the DES encryption circuit.

The encrypted audio data from the DES encryption circuit 22 are supplied to the DSP (Digital Signal Processor) 30. The DSP 30 communicates with the memory card 40 attached to an adapting mechanism, not shown, writing the encrypted data to the flash memory.

Serial communication is carried out between the DSP 30 and the memory card 40. In order to allocate a memory size enough for controlling the memory card 40, an external SRAM (Static Random Access Memory) 31 is connected to the DSP 30.

The DSP 30 is also connected to a terminal 32 through which content data and control data are transferred with external devices or external circuit blocks, not shown. The DSP 30 communicates with external devices and so on through an interface 37 shown in FIG. 2.

For example, if the recorder 1 is configured as stand-alone, the interface 37 and the terminal 32 are compliant with any of predetermined communication schemes such as USB, IEEE 1394, IEC 958, serial port, and parallel port and allow the recorder 1 to communicate with personal computers and audio/visual equipment.

If the recorder 1 is configuration as incorporated in a personal computer or an audio/visual device, the interface 37 and the terminal 32 are configured as an internal bus for example to be connected to the system controller in the personal computer or the audio/visual device.

From the device or block connected to the terminal 32, various data are supplied to the DSP 30. For example, if the recorder 1 is a part of an audio system or a computer system, an external system controller for controlling the entire operation of the audio system or the computer system gives data such as record and playback commands generated according to user's operations.

Additional information data such as image information and text information are also supplied to the DSP 30 through the terminal 32.

In addition, the DSP 30 can supply the additional information data and control signals read from the memory card 40 to the system controller.

FIG. 1 also shows an operation block 39 having various controls with which a user carries out desired operations and a display block 33 on which various pieces of information are displayed for the user. These blocks are especially required when the recorder 1 is configured as stand-alone. If the recorder 1 is incorporated in a personal computer, the operation block 39 and the display block 33 need not be directly connected to the DSP 30.

Namely, in the stand-alone configuration, the DSP 30 processes inputs from the operation block 39 and controls the display block 33. In the incorporated configuration, the system controller of the host device executes these control operations, supplying operational information to the DSP 30 and receiving information indicative of the contents to be displayed from the DSP 30 as required.

The encrypted audio data as content read by the DSP 30 from the memory card 40 are decrypted by the security IC 20 and the decrypted audio data are then ATRAC3-decoded by the audio encoder/decoder IC 10.

The decoded output of the audio encoder/decoder IC 10 is supplied to the D/A converter 18 to be converted into an analog audio signal. The analog audio signal is outputted to a line output terminal 19.

The line output is transmitted to an amplifier for example, not shown, to be reproduced through a speaker or a headphone.

It should be noted that a muting signal is supplied from an external controller to the D/A converter 18. If the muting signal indicates that muting is on, the audio output from the line output terminal 19 is suppressed.

FIG. 1 shows only the line output terminal 19. It will be apparent that a digital output terminal, a headphone terminal, and so on may be arranged.

The content data may also be outputted to an external device through the terminal 32 as described above.

Figure 2:
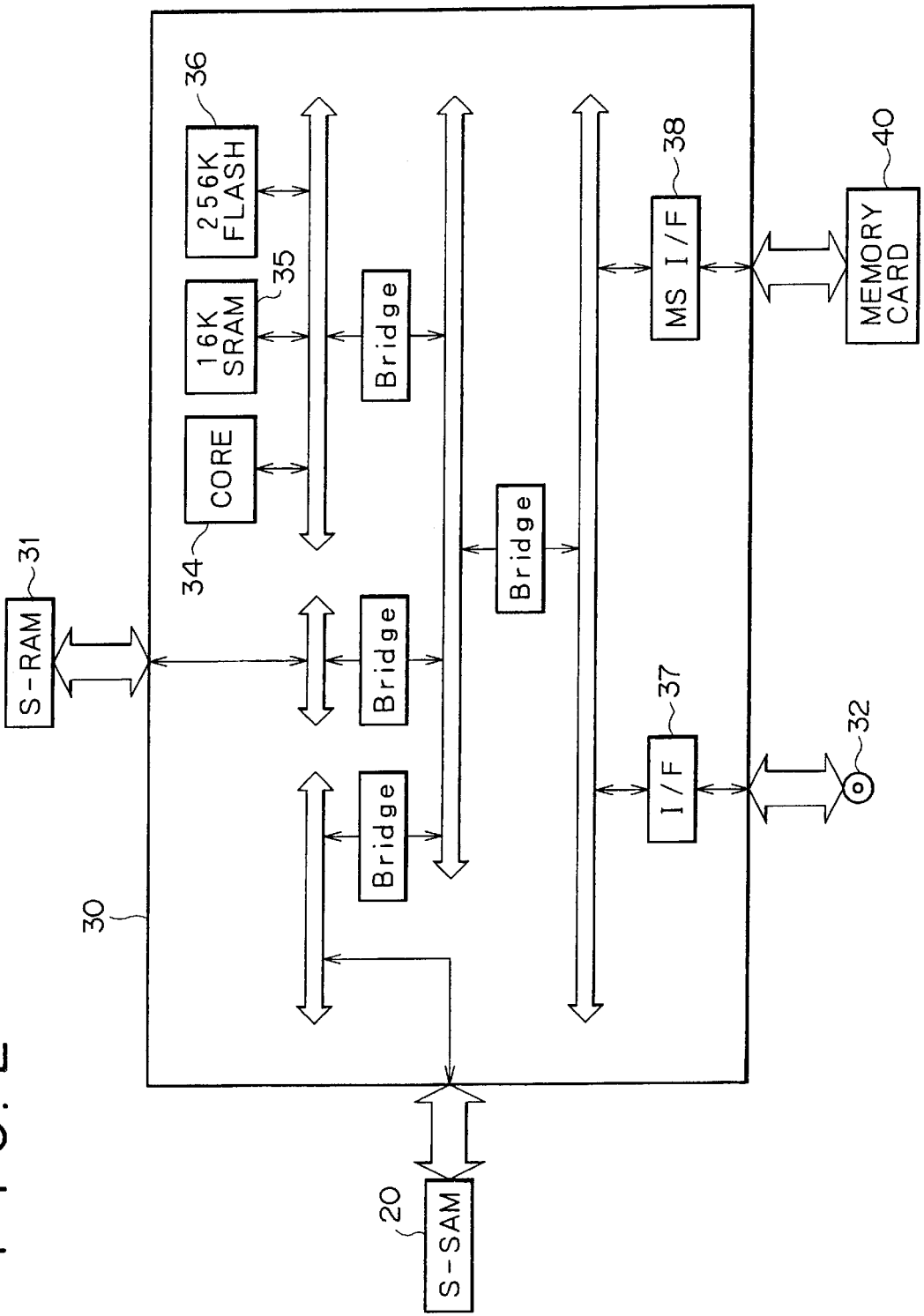
FIG. 2 is a block diagram illustrating a DSP of the recorder of the embodiment.

FIG. 2 shows an internal configuration of the DSP 30. The DSP 30 is made up of a core 34, a flash memory 35, an SRAM 36, an interface 37, a memory card interface 38, buses, and inter-bus bridges.

This DSP 30 functions like a microcomputer, the core 34 being equivalent to the CPU.

The flash memory 35 stores programs necessary for DSP processing. The SRAM 36 and the SRAM 31 are used for work memories necessary for various processing operations.

The DSP 30 responds to an operation signal such as a record command for example received through the interface 37 (or an operation signal inputted from the operation block 39 shown in FIG. 1) to write predetermined encrypted audio data and predetermined additional information data to the memory card 40 and control the processing of reading these data from the memory card 40.

To be more specific, the DSP 30 is positioned between application software for the entire audio system for recording/reproducing audio data and additional information and the memory card 40. The DSP 30 thus positioned operates by means of software such as access and file systems on the memory card 40.

The file management on the memory card 40 in the DSP 30 is made by a so-called FAT file system generally used on existing personal computers. In addition this file system, the present embodiment uses a reproduction management file having a data structure to be described later.

The reproduction management file manages the data files recorded on the memory card 40.

To be more specific, the reproduction management file as first file management information manages audio data files. The FAT as second file management information manages all files stored in the flash memory of the memory card 40 including the audio data files and the reproduction management file.

The reproduction management file is recorded on the memory card 40. The FAT is written on the flash memory before shipment from factory along with a root directory and so on.

It should be noted that, in the present embodiment, in order to protect copyright, the audio data compressed by ATRAC3 are encrypted. On the other hand, the management files are not encrypted because they are considered not to have to be copyrighted. Some versions of the memory card 40 have the encryption capabilities while others do not. The recorder 1 that records copyrighted audio data can use only the memory card having the encryption capabilities as with the present embodiment.

2. Configuration of memory card

Figure 3:
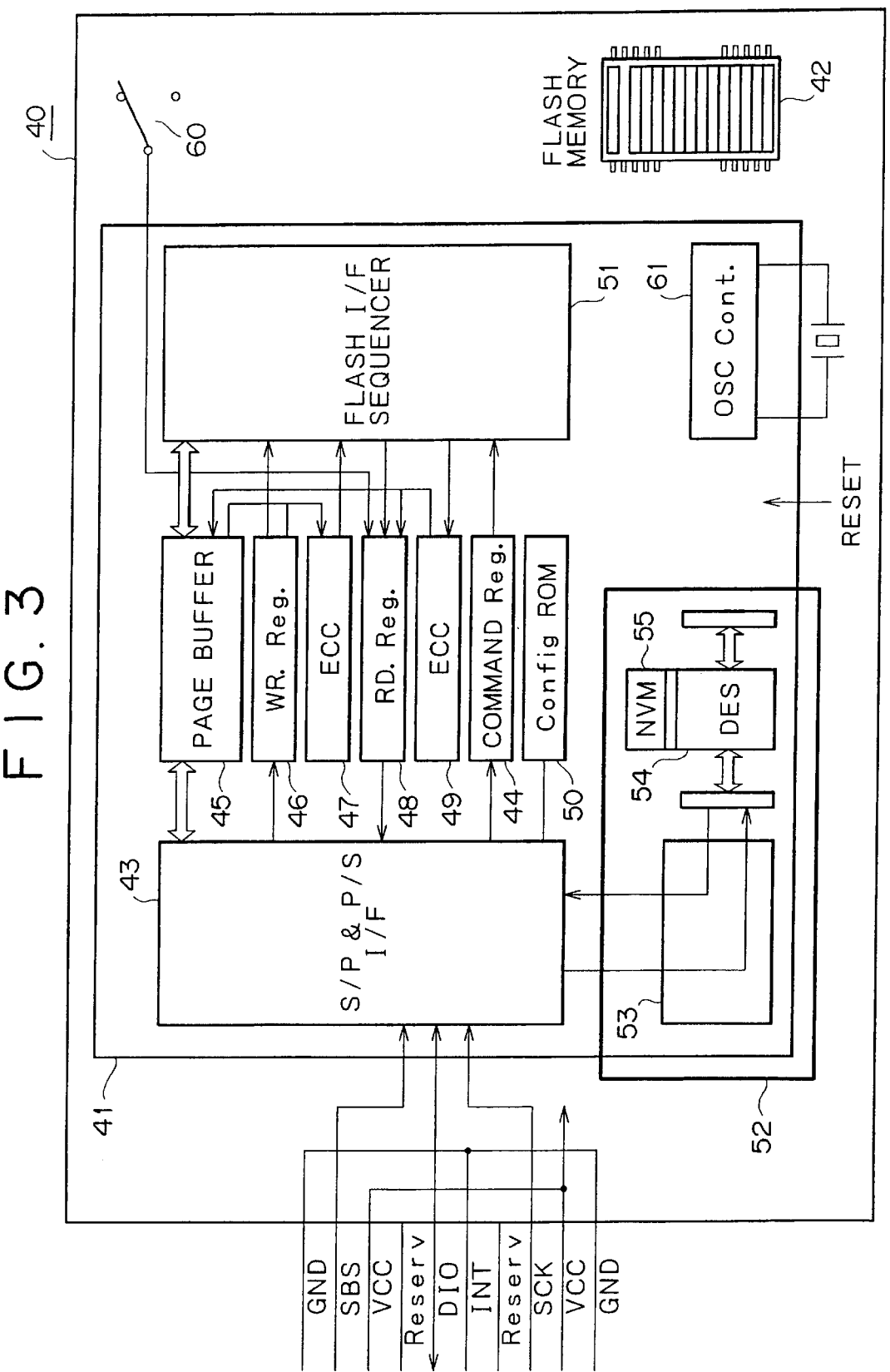
FIG. 3 is a block diagram illustrating the configuration of a memory card of the embodiment.

FIG. 3 shows the configuration of the memory card 40. The memory card 40 is made up of a control block 41 and a flash memory 42 on one IC chip.

A both-way serial interface between the DSP 30 of the recorder 1 and the memory card 40 is composed of 10 lines. Main four lines are a clock line SCK for transmitting a clock signal at data transmission, a status line SBS for transmitting status, a data line DIO for transmitting data, and an interrupt line INT. In addition, two ground lines GND and two supply lines VCC are arranged for power supply. Two reserved lines are undefined.

The clock line SCK transmits a clock signal synchronized with data. The status line SBS transmits a signal indicative of the status of the memory card 40. The data line DIO inputs and outputs commands and encrypted audio data. The interrupt line INT transmits an interrupt signal for requesting an interrupt by the memory card 40 to the DSP 30 of the recorder 1. An interrupt signal is generated when the memory card 40 is loaded in the recorder 1. In the present embodiment, however, the interrupt signal is transmitted over the data line DIO and therefore the interrupt line INT is grounded.

A serial/parallel conversion parallel/serial conversion interface block (S/P & P/S IF block) 43 provides interface between the DSP 30 of the recorder and the control block 41 interconnected through the above-mentioned plural lines. The S/P & P/S IF block 43 converts serial data received from the DSP 30 of the recorder 1 into parallel data and supplies them to the control block 41. It converts parallel data from the control block 41 into serial data and supplies them to the DSP 30 of the recorder 1. In addition, the S/P & P/S IF block 43 receives commands and data through the data line DIO and separates the received commands and data into those for normal access to the flash memory and those for encryption.

To be more specific, in a format transmitted over the data line DIO, a command is transmitted first, followed by data. Checking the code of the command, the S/P & P/S IF block 43 determines whether the transmitted command and data are for normal access or for encryption. According to the result of this determination, the command for normal access is held in a command register 44 and the data for normal access are held in a page buffer 45 and a write register 46. An error correction encoding circuit 47 is arranged as associated with the write register 46. For the data temporarily stored in the page buffer 45, the error correction encoding circuit 47 generates a redundant code of error correction code.

The data outputted from the command register 44, the page buffer 45, the write register 46, and the error correction encoding circuit 47 are supplied to a flash memory interface and sequencer (a memory IF sequencer) 51. The memory IF sequencer 51 provides interface between the control block 41 and the flash memory 42, controlling data transfer between them. Through the memory IF sequencer 51, data are written to the flash memory 42.

Content (the audio data compressed by ATRAC3, hereafter being referred to as ATRAC3 data) to be written to the flash memory 42 are encrypted by the security IC 20 of the recorder 1 and a security block 52 of the memory card 40 in order to protect copyright. The security block 52 has a buffer memory 53, a DES encryption circuit 54, and a nonvolatile memory 55.

The security block 52 of the memory card 40 has plural authentication keys and a storage key unique to each memory card. The nonvolatile memory 55 stores the keys necessary for encryption and is not visible from the outside. For example, the storage key is stored in the nonvolatile memory 55.

In addition, the security block 52 has a random number generator, allowing to perform authentication with the dedicated recorder 1 (meaning the inside of a system using a same predetermined data format for example) and to share session keys. Further, this allows to turn on key again by the storage key through the DES encryption circuit 54.

For example, authentication is carried out when the memory card 40 is loaded in the recorder 1. Authentication is executed by the security IC 20 of the recorder 1 and the security block 52 of the memory card 40.

When the recorder 1 recognizes that the loaded memory card 40 is what it claims to be (the memory card in the same system) and the memory card 40 recognizes that the mating recorder is what it claims to be (the recorder in the same system), cross authentication is established. When the authentication is made successful, the recorder 1 and the memory card 40 each generate a session key to share them. The session keys are generated every time authentication is performed.

When content is written to the memory card 40, the recorder 1 encrypts the content key by the session key and passes the encrypted content key to the memory card 40. The memory card 40 decrypts the received content key, encrypts it by the storage key, and passes the encrypted content key to the recorder 1.

The storage key is unique to each memory card 40. Receiving the encrypted content key, the recorder 1 executes format processing to write the encrypted content key and the encrypted content to the memory card 40.

When reading data from the flash memory 42, the read data are supplied to the page buffer 45, a read register 48, an error correction circuit 49 through the memory IF sequencer 51. The data held in the page buffer 45 are corrected by the error correction circuit 49.

The error-corrected output of the page buffer 45 and the output of the read register 48 are supplied to the S/P & P/S IF block 43 and then to the DSP 30 of the recorder 1 through the above-mentioned serial interface.

At the time of above-mentioned data reading, the content key encrypted by the storage key and the content encrypted by a block key are read from the flash memory 42. Then, the content key is decrypted by the security block 52 by use of the storage key.

The decrypted content key is encrypted by the session key to be sent to the recorder 1. The recorder 1 decrypts the content key by the received session key. The recorder 1 generates a block key by the decrypted content key. By means of this block key, the encrypted ATRAC3 data are sequentially decrypted.

It should be noted that a configuration ROM 50 stores the version information of the memory card 40 and various attribute information.

The memory card 40 also has a switch 60 which can be operated by the user for protecting the memory from erroneous deletion. When the switch 60 is at the deletion-disabled position, the flash memory 42 cannot be deleted even if a deletion command comes from the recorder.

An oscillator 61 generates a clock signal for providing timing reference for the processing of the memory card 40.

3. File system 3-1 Processing structure and data structure

Figure 4:
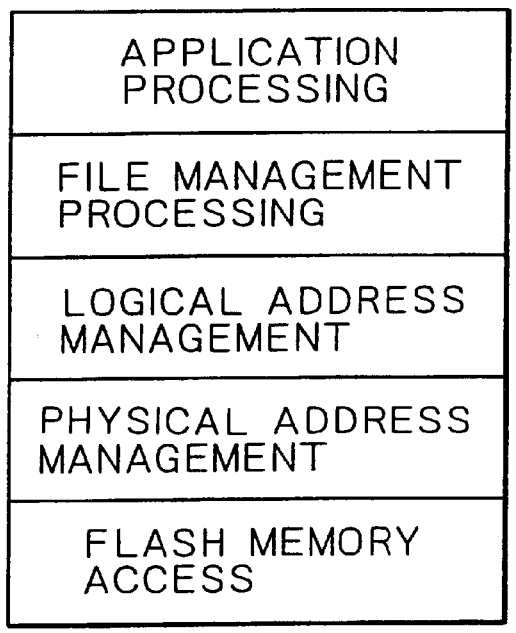
FIG. 4 is a diagram illustrating the configuration of a file system processing hierarchy of the memory card of the embodiment.

Referring to FIG. 4, there is shown a file system processing hierarchy of a system that uses the memory card 40 for a recording medium.

In the file system processing hierarchy, an application processing layer is top, followed by a file management processing layer, a logical address management layer, a physical address management layer, and flash memory access in this order.

In this hierarchical structure, the file management-processing layer is a FAT file system. A physical address is given to each block of the flash memory. The correlation between block and physical address is invariable. A logical address is an address to be logically handled by the file management-processing layer.

Figure 5:
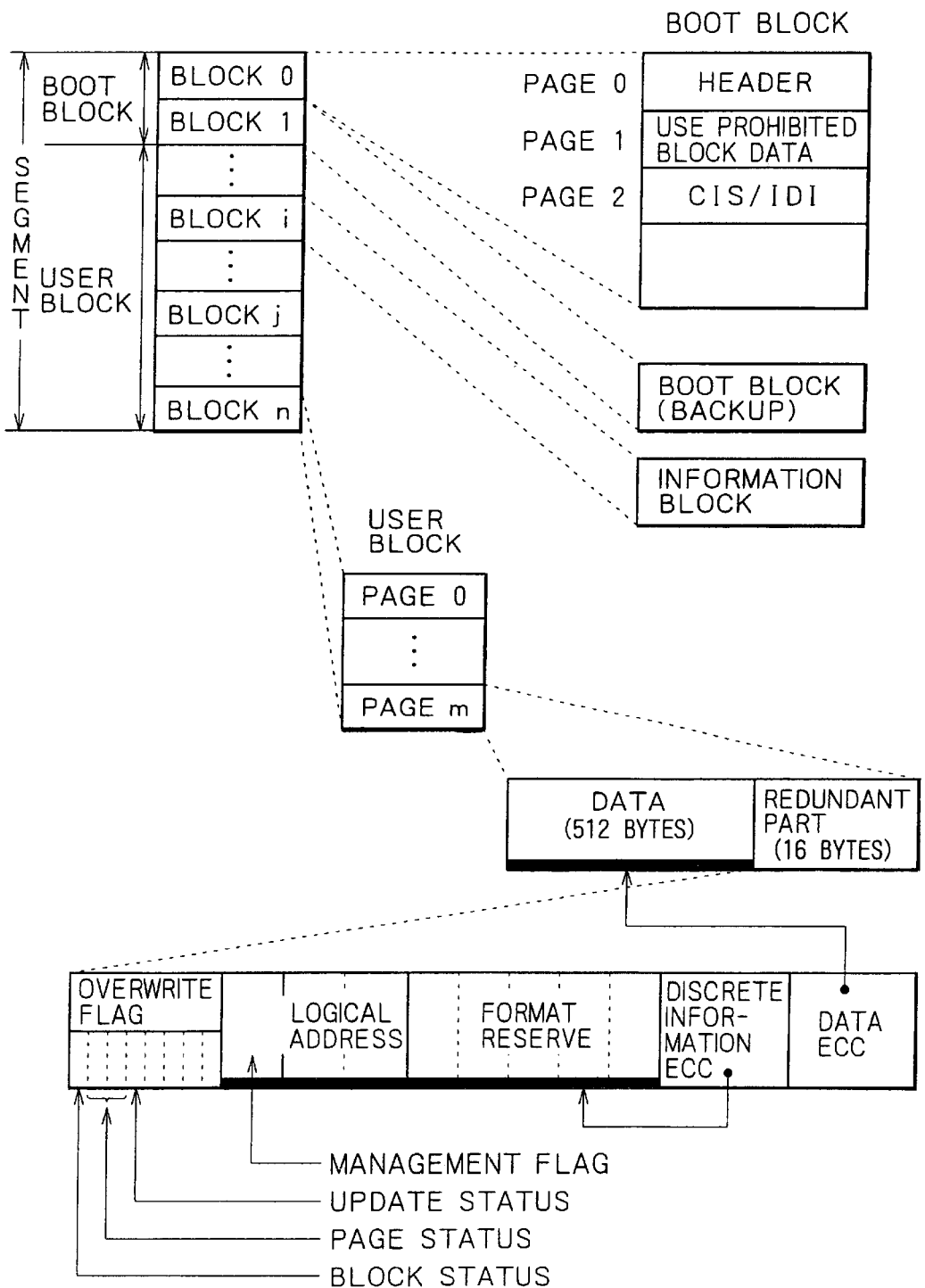
FIG. 5 is a diagram illustrating the format of the physical configuration of the data in the memory card of the embodiment.

Referring to FIG. 5, there is shown one example of a physical configuration of data in the flash memory 42 of the memory card 40.

In the flash memory 42 the data unit called segment is divided in a predetermined number of blocks (of a fixed length), each block being divided into a predetermined number of pages (of a fixed length). In the flash memory 42, data are deleted on a block basis and read or written on a page basis.

The blocks have a same size and the pages have a same size. One block is formed by pages 0 through m. One block is 8 KB (K bytes) or 16 KB wide for example. One page is 512 bytes wide for example. The size of the entire flash memory 42 is 4 MB (512 blocks) or 8 MB (1,024 blocks) when one block is 8 KB. When one block is 16 KB, the size of the flash memory 42 is 16 MB (1,024 blocks), 32 MB (2,048 blocks), or 64 MB (4,096 blocks).

One page is composed of a 512-byte data part and a 16-byte redundant part. The first three bytes of the redundant part form an overwrite part which is overwritten according to the update of data. Block status, page status, and update status are written to these three bytes in this order.

The remaining 13 bytes of the redundant part have fixed contents in general according to the contents of the data part. These 13 bytes are a management flag (1 byte), a logical address (2 bytes), a format reserved area (5 bytes), a discrete information ECC (2 bytes), and a data ECC (3 bytes).

The discrete information ECC is redundant data for error correction for the management flag, the logical address, and the format reservation. The data ECC is redundant data for error correction for 512-byte data.

For the management flag, a system flag (1=user block, 0=boot block), a conversion table flag (1=invalid, 0=table block), a copy inhibit specification (1=not prohibited, 1=prohibited), and an access permission (1=free, 0=read protected) are recorded.

The first two blocks in each segment, namely block 0 and block 1, form a boot block. Block 1 is backup to which the same data as block 0 are written.

The boot block is the first one of the valid blocks in the memory card 40 and therefore is accessed before all the other blocks when the memory card 40 is loaded in a device. The remaining blocks are user blocks.

The first page, page 0, of the boot block stores a header, a system entry, and boot and attribute information. Page 1 stores data about unusable blocks. Page 2 stores CIS (Card Information Structure)/IDI (Identity Drive Information).

The header of the boot block records a boot block ID and the number of valid entries in the boot block. The system entry records the start position of use-inhibited block data, the size thereof, the type thereof, the data start position of CIS/IDI, the size thereof, and the type thereof.

The boot and attribute information records a type of the memory card 40 (read only, readable and writable, or hybrid), a block size, a total number of blocks, security compliance, and data (date of manufacture and so on) associated with the production of the card.

So-called flash memories are subject to the deterioration of the insulation film every time data are written, thereby limiting the number of times data can be written to the flash memory. Therefore, it is required to prevent access to a same storage area (block) repeatedly and concentratedly. When rewriting data of a logical address stored at a physical address, the file system of flash memories prevents updated data from being written to the same block; the file system writes the updated data to a block unused so far. Consequently, the correlation between logical address and physical address changes after each update operation. This processing (called swap processing) can prevent repeated and concentrated access to a same block, thereby increasing the useful life of the flash memory.

The logical address is accompanied with the data once written to a block, so that, if blocks are different before and after updating data, the same address can be seen from the FAT, ensuring proper access thereafter. The swap processing causes a change in the correlation between logical and physical addresses, so that a logical-physical address conversion table is required. Looking at this conversion table identifies the physical address corresponding to the logical address specified by the FAT, thereby enabling access to the block indicated by the identified physical block.

The logical-physical address conversion table is stored by the DSP 30 into the SRAMs 31 and 36. If these SRAMs have no space enough for storing the table, it can be stored in the flash memory 42.

This table lists logical addresses (2 bytes each) in the ascending order along with the corresponding physical addresses. Since the maximum size of the flash memory 42 is 128 MB (8,192 blocks), 8,192 addresses may be represented by 2 bytes. In addition, the logical-physical address conversion table is managed for each segment, the size of the table increasing as the size of the flash memory 42 increases. For example, if the size of the flash memory is 8 MB (2 segments), 2 pages of each segment are used for the logical-physical address conversion table.

When storing the logical-physical address conversion table into the flash memory 42, predetermined one bit of the management flag in the redundant part of each page indicates a block in which the table is stored.

The above-mentioned memory card 40 is usable by the FAT system of personal computers like disc storage media.

Although not shown in FIG. 5, an IPL area, a FAT area, and a root directory area arranged on the flash memory 42.

The IPL area stores the address of a program to be loaded first into the memory of the recorder 1 and various pieces of information about the memory.

The FAT area stores information associated with blocks (clusters). The FAT specifies values indicative of unused blocks, a next block number, a defective block, and a last block.

The root directory area stores directory entries (file attribute, update date, start cluster, and file size).

In the present embodiment, apart from the file management system specified by the format of the above-mentioned memory card 40, a reproduction management file is provided for managing the tracks of a music file and the parts constituting each track. This reproduction management file is stored by the user block of the memory card 40 into the flash memory 42. Consequently, if the FAT stored in the memory card 40 is damaged, file recovery is ensured.

The reproduction management file is created by the DSP 30. For example, when the recorder 1 is powered on for the first time, it is determined whether the memory card 40 is loaded or not. If the memory card 40 is found loaded, authentication is executed. If the memory card 40 is found by the authentication to be a compliant memory card, the boot block of the flash memory 42 is read into the DSP 30. Then, the logical-physical address conversion table is read. The read data are stored in the SRAMs 31 and 36. If the memory card 40 is virgin for the user, the FAT and the root directory are written to the flash memory 42 before shipment. The user creates the reproduction management file upon data recording.

To be more specific, when a record command is given by the user to the DSP 30, the received audio data are compressed by the encoder/decoder IC 10 and the resultant ATRAC3 data are encrypted by the security IC 20. The DSP 30 records the encrypted ATRAC3 data onto the flash memory 42 of the memory card 40, after which the FAT and the reproduction management file are updated.

Every time a file update operation is executed, to be more specific, every time the recording of audio data is started and ended, the FAT and the reproduction management file are rewritten on the SRAMs 31 and 36. Then, when the memory card 40 is detached from the recorder 1 or when it is powered off, the last FAT and reproduction management files are stored from the SRAMs 31 and 36 into the flash memory 42 of the memory card 40. In this case, the FAT and reproduction management files on the flash memory 42 may be overwritten every time the recording of audio data is started and ended. When the audio data have been edited, the contents of the reproduction management file are also updated.

Further, in the data structure of the present embodiment, additional information is also created and updated in the reproduction management file to be recorded in the flash memory 42. It should be noted that an additional information management file may be created apart from the reproduction management file.

The additional information is given to the DSP 30 from an external controller through the bus and the bus interface 32. The DSP 30 records the received additional information to the flash memory 42 in the memory card 40. The additional information does not go through the security IC 20, so that it is not encrypted. The additional information is written from the SRAM of the DSP 30 to the flash memory 42 when the memory card 40 is detached from the recorder or when it is powered off.

3-2 Directory structure

Figure 6:
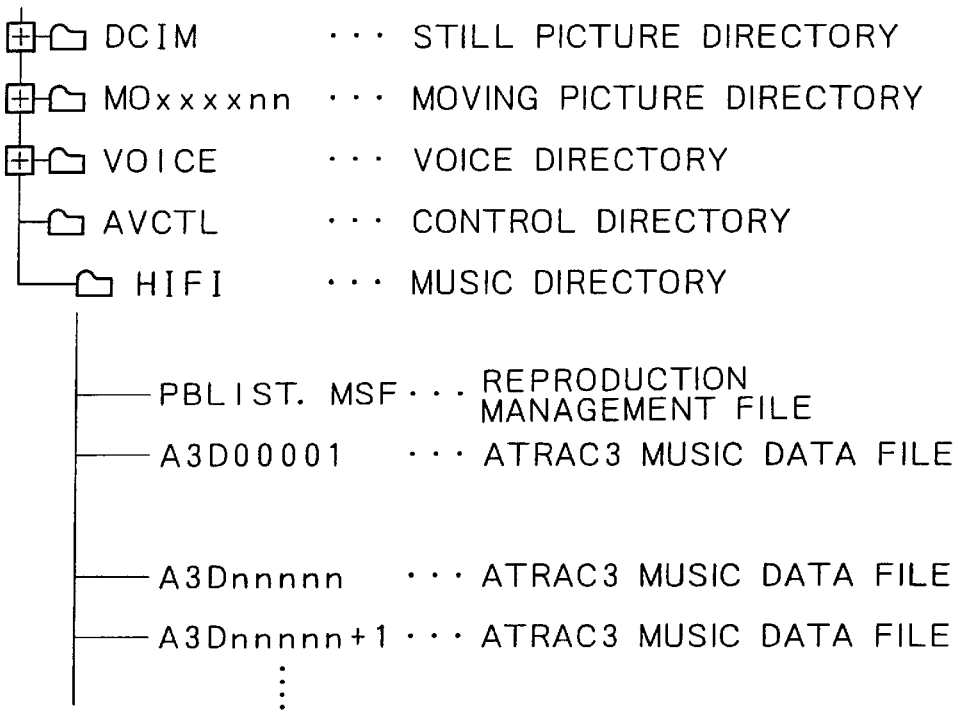
FIG. 6 is a diagram illustrating a directory structure of the memory card of the embodiment.

Referring to FIG. 6, there is shown a directory structure of the memory card 40. As shown, a still picture directory, a moving picture directory, a voice directory, a control directory, and a music directory (HIFI) in this order follow a root directory.

In the present embodiment, the description is made mainly by taking music recording/reproduction for example. Therefore, in what follows, the music directory will be described.

The music directory has two types of files. One is a reproduction management file PBLIST.MSF (hereafter simply referred to as a PBLIST. The other is an ATRAC3 data file A3Dnnnn.MSA (hereafter simply referred to as A3Dnnn) storing encrypted music cata.

The number of ATRAC3 data file is up to 400. The ATRAC3 data file is registered in the reproduction management file and then is created by a device concerned.

3-3 Management structure and editing scheme

Figure 7:
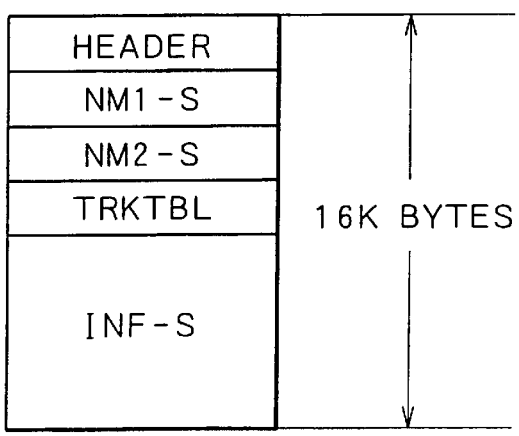
FIG. 7 is a diagram illustrating a data configuration of a reproduction management file of the memory card of the embodiment.
Figure 8:
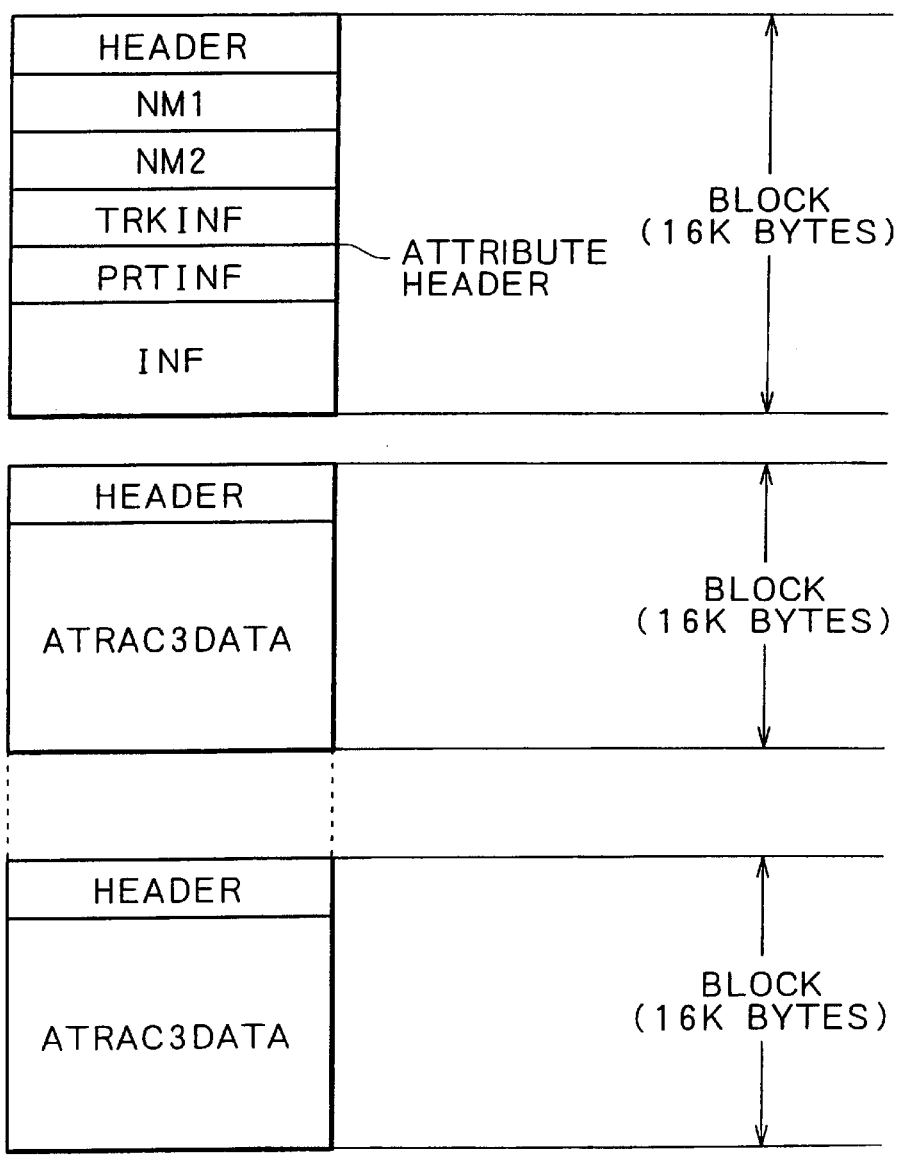
FIG. 8 is a diagram illustrating a data configuration of a data file of the memory card of the embodiment.

Referring to FIG. 7, there is shown a structure of the reproduction management file. Referring to FIG. 8, there is shown a structure of the ATRAC3 data file (of one piece of music).

The reproduction management file has a fixed length of 16 KB.

The ATRAC3 data file (hereafter simply referred to as a data file) is provided for every piece of music and composed of an attribute header at the beginning of the file and subsequent actual encrypted music data. The attribute header has a fixed length of 16 KB and has a configuration like that of the reproduction management file.

As shown in FIG. 7, the reproduction management file is composed of a header, a 1-byte memory card name HM1-S, a 2-byte code memory card name NM2-S, a reproduction table TRKTBL listing a sequence in which pieces of music are arranged, and additional information INF-S for the entire memory card.

As shown in FIG. 8, the attribute header at the beginning of the data file is composed of a header, a 1-byte code music name NM1, a 2-byte code music name NM2, track information TRKINF such as track key information, part information PRTINF, and track additional information INF. The header includes a total number of parts, name attribute, additional information size, and so on.

In this data file, the attribute header is followed by ATRAC3 music data. The music data are divided into 16-KB blocks, each block beginning with a header. The header includes an initial value for decrypting encrypted data.

It should be noted that encryption processing is executed only on the music data in each ATRAC3 data file; the other data are not encrypted.

Referring to FIGS. 9A, 9B, and 9C, a relation between music (track) and ATRAC3 data file will be described.

One track denotes one piece of music. One piece of music is made up of one ATRAC3 data file (refer to FIG. 8). The ATRAC3 data file stores audio data compressed by ATRAC3 scheme.

Data are recorded on the memory card 40 on a cluster basis. One cluster is 16 KB large for example. This cluster has no plural files. The minimum unit in which the flash memory 42 is deleted is one block.

In the case of the memory card 40 for use in recording music data, a block and a cluster are synonymous and one cluster is defined a one sector.

One piece of music is basically constituted by one part. When one piece of music is edited, two or more parts may constitute it. A part denotes a unit of data recorded in a continuous time from the beginning of recording to its end. Normally, one track is constituted by one part.

The joints between parts are managed by part information PRTINF (to be described later) in the attribute head of each piece of music. To be more specific, a part size is indicated by 4-byte data called part size PRTSIZE in the PRTINF. The first two bytes of the part size PRTSIZE indicate the total number of clusters of that part. The subsequent bytes indicate the position of a start sound unit (abbreviated as SU) and an end SU in start and end clusters.

The above-mentioned part description scheme eliminates the necessity for moving large amounts data when editing music data.

If music data are edited only on a block basis, the moving of music data may be avoided as above; however, as compared with SU unit, block unit is too large to edit music data.

SU is the minimum unit of part and the minimum data unit to be used when audio data are compressed by ATRAC3. Data of several hundred bytes obtained by compressing audio data of about 1,024 samples (1,024×16 bits×2 channels) obtained by sampling frequency of 44.1 KHz into 1/10 of the original data size are SUs.

One SU is equivalent to about 23 ms. Normally, one part is composed of as many as several thousand SUs.

When one cluster is composed of 42 SUs, one cluster can represent a sound of about one second long.

The number of parts constituting one track depends on the size of additional information.

The number obtained by removing the header, music name, and additional information data from one block determines the number of parts, so that the maximum number of parts (645) may be used where there is no additional information at all.

FIGS. 9A, 9B, and 9C show a file configuration resulted from recording audio data, two pieces of music continuously, from a CD for example.

FIG. 9A shows a case in which one piece of music (data file #1) is constituted by five clusters for example. FIG. 9C shows a case in which two pieces of music (data file #2) are constituted by six clusters for example.

Between music 1 and music 2, it is not permitted that two files exist in one cluster, so that data file #2 is created from the beginning of the next cluster.

Consequently, if the end (the end of music 1) of data file #1 is located halfway in the cluster, no data (SU) is regarded existent in the remaining portion of that cluster as shown in FIG. 9B in an expanded manner.

This holds true with music 2 (data file #2).

In the above-mentioned example, each of data files #1 and #2 is constituted by one part.

For the data file recorded on the memory card 40, four types of edit processing are specified; divide, combine, erase, and move.

Divide processing divides one track into two. When this processing has been performed, the total number of tracks increases by one. Divide processing divides one file in the file system into two and updates the reproduction management file.

Combine processing combines two files into one. When combine processing has been performed, the total number of tracks decreases by one. Combing processing combines two files in the file system into one and updates the reproduction management file.

Erase processing erases a track. The numbers of the tracks following the erased track are rolled forward by one.

Move processing in editing changes the sequence of tracks. When move processing has been performed, the reproduction management file is updated.

It should be noted that "move" as edit processing does not involve the movement of data. Therefore, "move" as edit processing is different from "move" for moving data from a recording medium such as HDD for example to another recording medium such as memory card for example. As described, "move" of data between recording media is achieved by copying the data and then delete them from the source recording medium from which the data have been copied.

Figure 10:
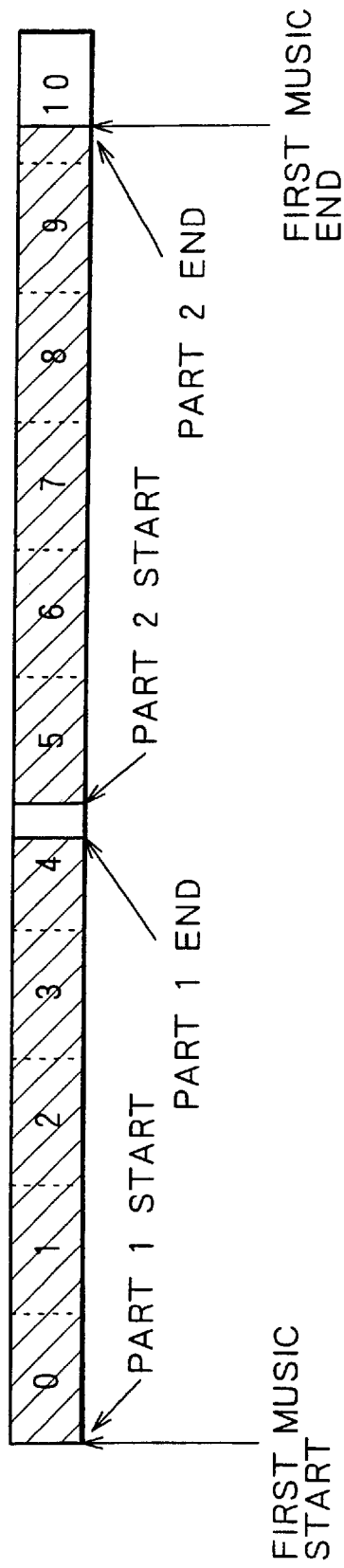
FIG. 10 is a diagram illustrating combine edit processing of the data file of the embodiment.

A result of combining two files (data files #1 and #2) shown in FIGS. 9A, 9B, and 9C is shown in FIG. 10. The two data files #1 and #2 are combined into one data file #1. Data file #1 is made up of two parts.

Figure 11:
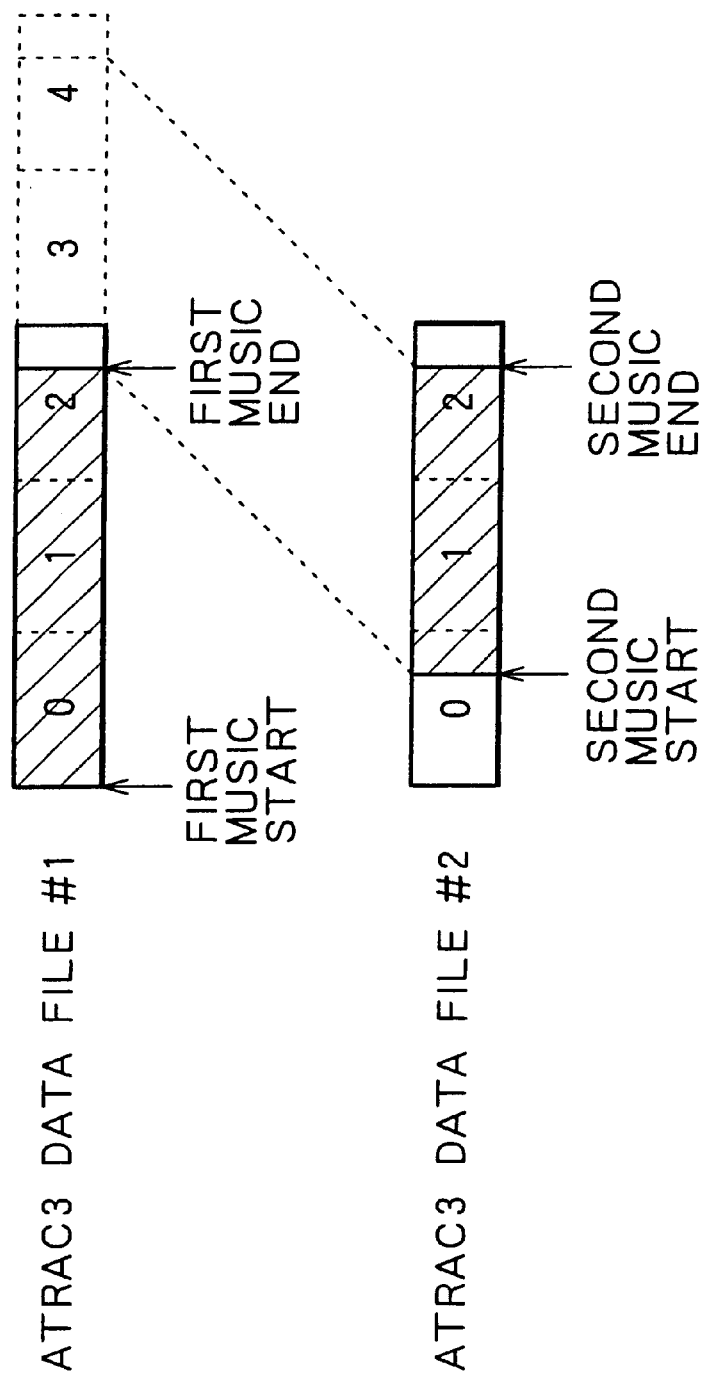
FIG. 11 is a diagram illustrating a divide edit processing of the data file of the embodiment.

FIG. 11 shows a result of dividing one piece of music (data file #1) shown in FIG. 9A midway in cluster 2.

Divide processing results in data file #1 made up of clusters 0 and 1 and a front portion of cluster 2 and data file #2 made up of a rear portion of cluster 2 and clusters 3 and 4.

As described, in the present embodiment, the part description scheme is provided, so that the start and end positions of part 1 and the start and end positions of part 2 can be specified in SU unit. Consequently, it becomes unnecessary to move the music data of part 2 to fill the joint resulted from the combine processing.

In addition, the part description scheme makes it unnecessary to move the data so that the space at the beginning of data file #2 resulted from the divide processing (FIG. 11) is filled.

3-4 Reproduction management file

Referring to FIG. 12, there is shown a detail data configuration of the reproduction management file PBLIST. The reproduction management file PBLIST has a size of one cluster (1 block=16 KB).

The first 32 bytes provide the header.

The portions other than the header are a name NM1-S (256 bytes) for the entire memory card, a name NM2-S (512 bytes), a CONTENTS KEY, an MAC, an S-YMDhms, a table TRKTBL (800 bytes) for managing the sequence of reproduction, and additional information INF-S (14,720 bytes) for the entire memory card. At the end of this file, a part of the information in the header is recorded again. These different types of data start at predetermined positions in the reproduction management file.

In the reproduction management file, the first 32 bytes represented by (0x0000) and (0x000) provide the header.

It should be noted that every 16bytes from the beginning of the file are called a slot.

The headers arranged in the first and second slots of the reproduction management file contain the following data of meaning, function, and value in this order from the beginning.

Data indicated as "Reserved" denote undefined data. Normally, a null (0x00) is written for the reserved data. Regardless of what is written, the reserved data are ignored. This is, however, subject to change in a future version. The position of reserved data is writeprotected. If a portion written as "Option" is not used, it is handled in the same manner as reserved data.

BLKID-TL0 (4 bytes)

Meaning: block file ID.

Function: a value for identifying the beginning of the reproduction management file.

Value: "TL=0" (for example, 0x544C2D30).

MCcode (2 bytes)

Meaning: maker code.

Function: the code for identifying the maker and the model of a device on which recording has been made.

Value: high-order 10 bits (maker code) and low-order 6 bits (model code).

REVISION (4 bytes)

Meaning: the number of times the reproduction management file (PBLIST) has been rewritten.

Function: REVISION increments every time the reproduction management file has been rewritten.

Value: starts from 0 and increments by one.

SN1C+L (2 bytes)

Meaning: the attribute of the name (1 byte) of the memory card to be written to NM1-S area.

Function: SN1C+L represents a character code and a language code to be used in one byte each.

Value: character code (C) identifies characters by high-order 1 byte as shown below:

00: no character code is set; handled simply as a binary number.

01: ASCII 02: ASCII+KANA 03: modified 8859-1
81: MS-JIS 82: KS C 5601-1989 83: GB2312-80 90: S-JIS (for Voice).

Language code (L) identifies languages by low-order 1 byte as per EBU Tech 3258 as shown below:

00: not set. 08: German 09: English 0A: Spanish 0F: French 15: Italian 1D: Dutch 65: Korean 69 Japanese 75: Chinese If there is no data, zeros are filled.

SN2C+L (2 bytes)

Meaning: the attribute of the name (2 bytes) of the memory card to be written to NM2-S area.

Function: SN2C+L represents a character code and a language code to be used in one byte each.

Value: the same as the above-mentioned SN1C+L.

SINFSIZE (2 bytes)

Meaning: the size obtained by adding all additional information associated with the entire memory card to be written to INF-S area.

Function: SINFSIZE describes a data size in a unit of 16 bytes; if there is no data, zeros are filled.

Value: the size is from 0x000 to 0x39C (924).

T-TRK (2 bytes)

Meaning: total track number.

Function: the number of total tracks.

Value: 1 to 0x0190 (up to 400 tracks); if there is no data, zeros are filled.

VerNo (2 bytes)

Meaning: the version number of format.

Function: high-order indicates major version number and low-order indicates minor version number.

Value: example 0x0100 (Ver 1.0)
0x0203 (Ver 2.3)

The data that follow the above-mentioned header are as follows:

NM1-S

Meaning: the name of one byte associated with the entire memory card.

Function: variable-length name data (up to 256) represented in 1-byte character code. The name data always end with a termination code (0x00). The size is counted from this termination code. If there is no data, null (0x00) is recorded at least 1 byte from the beginning (0x0020).

Value: various character codes. NM2-S

Meaning: the 2-byte name associated with the entire memory card.

Function: the variable-length name data (up to 512) represented in a 2-byte character code. The name data always end with a termination code (0x00). The size is counted from this termination code. If there is no data, null (0x00) is recorded at least 2 bytes from the beginning (0x0120).

Value: various character codes.

CONTENTS KEY

Meaning: a value prepared for each piece of music. This value is protected by MG (M) and then stored. The value here is the same as CONTENTS KEY attached to the first piece of music.

Function: the key necessary for computation of MAC of S-YMDhms.

Value: from 0 to 0xFFFFFFFFFFFFFFFF.

MAC

Meaning: the value for checking for tamper of copyright information.

Function: the value created from the contents of S-YMDhms and CONTENTS KEY.

Value: from 0 to 0xFFFFFFFFFFFFFFFF.

TRK-nnn

Meaning: SQN (sequence) number of the ATRAC3 data file to be reproduced.

Function: TRK-nnn describes FNo in TRKINF.

Value: from 1 to 400 (0x190). If there is no data, zeros are filled.

INF-S

Meaning: additional information data (for example, information about photograph, lyrics, and description) associated with the entire memory card.

Function: variable-length additional information data accompanying a header. Two or more different pieces of additional information may be arranged, each being attached with ID and data size. Each piece of additional information data including a header are at least 16 bytes in integral multiples of 4 bytes. Details of this will be described later.

Value: refer to the configuration of additional information data.

S-YMDhms (4 bytes) (optional)

Meaning: Year, month, day, hour, minute and second of recording made by a device having a reliable clock.

Function: the value for identifying the last recording date and time; essential for EMD.

Value:
  bits 25 to 31 year 0 to 99 (1980 to 2079)
  bits 21 to 24 month 0 to 12
  bits 16 to 20 day 0 to 31
  bits 11 to 15 hour 0 to 23
  bits 05 to 10 minute 0 to 59
  bits 00 to 04 second 0 to 29 (in unit of 2 seconds)

For the last slot of the reproduction management file, the same BLKID-TL0, MCode, and REVISION as those in the header are written.

For example, in the case of a consumer audio system, a memory card may be detached during recording or the system is power off inadvertently, thereby requiring the detection of these abnormal conditions upon recovery of the system.

As described, REVISION is written at the beginning and end of each block and, every time REVISION is written, the rewrite count is incremented by 1. Consequently, if an abnormal condition occurs halfway in the block, the values of the beginning REVISION and end REVISION do not agree, thereby allowing the detection of the abnormal end.

Thus, two REVISIONs in a block allow the detection of abnormal ends at a high probability. When an abnormal end has been detected, a warning such as error message display is given.

Because fixed value BLKID-TL0 is inserted at the beginning of each block (16 KB), this fixed value may be used as a guideline of repair for a damaged FAT if any. To be more specific, checking the fixed value at the beginning of each block allows the determination of the type of the file. In addition, because this fixed value BLKID-TL0 is written to the header and the end of each block in a duplicate manner, its reliability may be checked. It should be noted that the same BLKID-TL0 as that of the reproduction management file PBLIST may be recorded in a duplicate manner.

As compared with the reproduction management file, the ATRAC3 data file has a fairly large amount of data (for example, sometimes several thousand concatenated blocks).

Each ATRAC3 data file is attached with a block number BLOCK SERIAL to be described later. Normally, each ATRAC3 data file has two or more blocks on the memory card. Therefore, unless the content is identified by CONNUM0 and then BLOCK SERIAL is attached, duplication occurs, thereby making it difficult to make file recovery upon damage of the FAT.

Likewise, if a file is troubled by erroneous logic, not going far enough for the damage of FAT, a maker code (MCode) is recorded at the beginning and end of each block for the identification of the model of the device on which the recording has been made.

Referring to FIG. 13, there is shown a configuration of additional information data (INF-S) to be recorded on the reproduction management file.

The additional information starts with a header shown below, followed by variable-length data.

INF

Meaning: field ID.

Function: a fixed value indicative of the beginning of additional information data.

Value: 0x69.

ID

Meaning: an additional information key code.

Function: ID indicates the classification of additional information.

Value: from 0 to 0xFF.

SIZE

Meaning: the size of individual additional information.

Function: the data size is free but must always be an integral multiple of 4 bytes and at least 16 bytes. If the data end with a space, it is filled with null (0x00).

Value: from 16 to 14784 (0x39C0).

MCode

Meaning: maker code.

Function: the code for identifying the maker and the model of a device on which recording has been made.

Value: high-order 10 bits (maker code) and low-order 6 bits (model code). C+L

Meaning: the attribute of characters to be written in a data area starting from byte 12.

Function: a character code and a language code to be used is represented in 1 byte each.

Value: same as the above-mentioned SN1C+L.

DATA

Meaning: individual additional information data.

Function: DATA represents in variable-length data. The real data always starts from byte 12 and must be at least 4 bytes in length (size) and always an integral multiple of 4 bytes. If the data end with a space, it is filled with null (0x00).

Value: individually defined according to contents.

Referring to FIG. 14, there is shown an example of the correlation between additional information key code values (0 to 63) and additional information types. Key code values (0 to 31) are assigned to music-associated information (character information) and key code values (32 to 63) are assigned to URL (Uniform Resource Locator) (Web-associated information). Character information such as album title, artist name, and CM is recorded as additional information.

Referring to FIG. 15, there is shown an example of the correlation between additional information key code values (64 to 127) and additional information types. Key code values (64 to 95) are assigned paths/other information and key code values (96 to 127) are assigned to control/numeric data.

For example, in the case of (ID=98), the additional information is TOC-ID. TOC-ID indicates a first music number, a last music number, that music number, a total playback time, and a playback time of that music, on the basis of TOC information of CD (Compact Disc).

Referring to FIG. 16, there is shown an example of the correlation between additional information key code values (128 to 159) and additional information types. Key code values (128 to 159) are assigned to the information associated with synchronous reproduction. EMD in FIG. 16 denotes electronic music distribution.

Referring to FIGS. 17A, 17B, 17C, 17D, and 17E, specific examples of additional information data will be described. FIG. 17A shows a data structure of additional information data as with FIG. 13.

FIG. 17B shows an example in which additional information is an artist name with key code ID=3. SIZE is 0x1C (28 bytes). The data length of this additional information including header is 28 bytes. With C+L, character code C=0x01 and language code L=0x09. This value is an ASCII character code that indicates the language is English according to the specification shown above. The data about an artist name "SIMON&ABCDEFGHI" for example is written in one byte starting from byte 12. Since the size of additional information is specified as an integral multiple of 4 bytes, the remainder of one byte is (0x00).

FIG. 17C shows an example in which additional information is ISRC (International Standard Recording Code: copyright code) with key code ID=97. SIZE is 0x14 (20 bytes), indicating that the data length of this additional information is 20 bytes. With C+L, C=0x00 and L=0x00, which indicate that neither character nor language is set; namely, the data are binary. Then, an 8-byte ISRC code is written as data. ISRC indicates copyright information (country, copyright holder, recording date, and serial number).

FIG. 17D shows an example in which additional information is a recording date with key code ID=97. SIZE is 0x10 (16 bytes), indicating that the data length of this additional information is 16 bytes. With C+L, C=0x00 and L=0x00, indicating that neither character nor language is set. Then, a 4-byte (32 bits) code is written as data, indicating a recording date (year, month, day, hour, minute, second).

FIG. 17E shows an example in which additional information is a reproduction log with key code ID=107. SIZE is 0x10 (16 bytes), indicating that the data length of this additional information is 16 bytes. With C+L, C=0x00 and L=0x00, indicating that neither character nor language is set. Then, a 4-byte (32 bits) code is written as data, indicating a reproduction log (year, month, day, hour, minute, second). The reproduction log records 16 bytes of data every time reproduction is performed.

3-5 Data file

Referring to FIG. 18, there is shown a data array of ATRAC3 data file (A3Dnnnn) in which one SU is N bytes (for example, N=384 bytes).

FIG. 18 shows, as a data file as shown in FIG. 8, a block as attribute header and a block in which music is actually recorded.

FIG. 18 shows the start bytes (0x0000 through 0x7FF0) of the slots of these blocks (16×2=32K bytes).

As shown in FIG. 18, the first 32 bytes of the attribute header provide the header, followed by 256 bytes providing music name area NM1 (256 bytes) and 512 bytes of music name area NM2 (512 bytes).

The header of the attribute header includes the following data.

BLKID-HD0 (4 bytes)

Meaning: block file ID.

Function: a value for identifying the beginning of ATRAC3 data file.

Value: fixed value="HD=0" (for example, 0x48442D30).

MCode (2 bytes)

Meaning: maker code.

Function: the code for identifying the maker and the model of a device on which recording has been made.

Value: high-order 10 bits (maker code) and low-order 6 bits (model code).

BLOCK SERIAL (4 bytes)

Meaning: a serial number attached to each track.

Function: the first block starts with 0, subsequent blocks having serial numbers in increment of 1; these numbers remain unchanged after edit processing.

Value: from 0 to 0xFFFFFFFF.

N1C+L (2 bytes)

Meaning: the attribute of track (music name) data (NM1).

Function: a character code and a language code for use in NM1 are represented in 1 byte each.

Value: same as SN1C+L.

N2C+L (2 bytes)

Meaning: the attribute of track (music name) data (NM2).

Function: a character code and a language code for use in NM2 are represented in 1 byte each.

Value: same as SN1C+L.

INFSIZE (2 bytes)

Meaning: a size obtained by totaling all pieces of additional information associated with track.

Function: INFSIZE describes a data size in unit of 16 bytes. If there is no data, zeros are filled.

Value: the size is 0x0000 to 0x3C6 (966).

T-PRT (2 bytes)

Meaning: the total number of parts.

Function: T-PRT represents the number of parts constituting a track; normally 1.

Value: from 1 to 0x285 (645 dec).

T-SU (4 bytes)

Meaning: the total number of SUs.

Function: T-SU represents the actual total number of SUs in one track; equivalent to a music reproduction time.

Value: from 0x01 to 0x001FFFFF.

INX (2 bytes) (optional)

Meaning: the relative position of INDEX.

Function: the pointer indicative of the beginning of a characteristic portion of music, specifying the position from the beginning of music by a value obtained by dividing the number of SUs by 4; equivalent to a duration of time (about 93 ms) four times as long as normal SU.

Value: from 0 to0xFFFF (up to about 6084 seconds).

XT (2 bytes) (optional)

Meaning: the reproduction time of INDEX.

Function: XT specifies the time to be reproduced from the beginning specified by INX-nnn by a value obtained by dividing the number SUs by 4; equivalent to a duration of time (about 93 ms) four times as long as a normal SU.

Value:
  0x0000: no setting; from 0x01 to 0xFFFE (up to 6084 seconds).
  0xFFFF: up to the end of music.

The following describes music name areas NM1 and NM2 in the attribute header.

NM1
  Meaning: a character string indicative of music name.
  Function: a variable-length music name (up to 256) represented in a 1-byte character code. The name data always end with a termination code (0x00). The size is computed from this termination code. If there is no data, one or more bytes of null (0x00) are recorded at least from the beginning (0x0020).
  Value: each type of character code.

NM2
  Meaning: a character string indicative of music name.
  Function: variable-length name data (up to 512) represented in a 2-byte character code. The name data always end with a termination code (0x00). The size is computed from this termination code. If there is no data, two or more bytes of null (0x00) are recorded at least from the beginning (0x0120).
  Value: each type of character code.

The 80-byte data starting from the fixed position (0x0320) of the attribute header are called a track information area TRKINF, which mainly manages information associated with security and copy control in a collective manner. The following describes the data in TRKINF in the order of arrangement.

CONTENTS KEY (8 bytes)
  Meaning: a value prepared for each piece of music, which is protected by the security block of the memory card and then stored.
  Function: a first key which becomes necessary for reproduction of music and used for computing C-MAC[n].
  Value: from 0 to 0xFFFFFFFFFFFFFFFF.

C-MAC[n] (8 bytes)
  Meaning: a value for checking for tamper of copyright information.
  Function: a value created from the contents of plural TRKINFs including content accumulation number and a hidden sequence number. The hidden sequence number denotes a sequence number recorded in a hidden area of the memory card. Any recorder not compliant with copyright cannot read the hidden area. A dedicated recorder compliant with copyright or a personal computer installed with software capable of reading the memory card can access the hidden area.

A (1 byte)
  Meaning: the attribute of a part.
  Function: information such as a compression mode in a part.
  Value: the value is described below with reference to FIG. 19. It should be noted that, for monaural of N=0, 1, a special joint mode in which bit 7 is 1 and sub signal is 0 and only main signal (L+R) is provided is specified as monaural. Normal reproducing devices may ignore information of bits 2 and 1.

Bit 0 of A forms information of emphasis on/off. Bit 1 forms information about reproduction SKIP or normal reproduction. Bit 2 forms information about data division; for example, audio data or other data such as FAX.

Bit 3 is undefined.

By combining bits 4, 5 and 6, rate information is specified as shown.

To be more specific, N denotes a rate value represented in three bits, indicating recording time (in the case of a 64-MB memory card), data transfer rate, the number of SUs in one block, and the number of bytes of one SU for five types of modes; monaural (N=0), LP (N=2), SP (N=4), EX (N=5, 6), and HQ (n=7).

Bit 7 indicates the mode (0: dual, 1: joint) of ATRAC 3.

The following describes the case of SP mode by use of a 64-MB memory card for example. The 64-MB memory card has 3968 blocks. In the SP mode, one SU has 304 bytes, so that one block has 53 SUs. One SU is equivalent to (1,024/44,100) seconds. Therefore, one block is (1,024/44,100)×53×(3,968−16)=4,863 seconds=81 minutes. The transfer rate is (44,100/1,024)×304×8=104,737 bps.

LT (1 byte)
  Meaning: a reproduction limit flag (bit 7 and bit 6) and a security version (bit 5 through bit 0).
  Function: LT indicates that there is a limitation to this track.
  Value:
    bit 7: 0=not limited; 1=limited.
    bit 6: 0=within limit of time; 1=out of limit of time.
    bit 5 through bit 0: security version 0 (if security version is other than 0, reproduction is inhibited).

FNo (2 bytes)
  Meaning: a file number.
  Function: a track number at the first recording and this number identifies the position of a value for MAC computation recorded in the hidden area of the memory card.
  Value: from 1 to 0x190 (400).

MG (D) SERIAL-nnn (16 bytes)
  Meaning: the serial number of a security block (the security IC 20) of the recording device.
  Function: a unique value which is different between recording devices.
  Value: from 0 to 0xFFFFFFFFFFFFFFFFFFFFFFFFFFFFFFFF.

CONNUM (4 bytes)
  Meaning: a content accumulation number.
  Function: a unique value to be accumulated for each piece of music and managed by the security block of the recording device. This number is prepared for 2 to the 32nd power, or 4.2 billion pieces of music and is used for identifying recorded music.
  Value: from 0 to 0xFFFFFFFF.

YMDhms-S (4 bytes) (optional)
  Meaning: the reproduction start date for a track subject to reproduction limit.
  Function: the date on which reproduction start specified by EMD is permitted.
  Value: same as the notation of the above-mentioned date.

YMDhms-E (4 bytes) (optional)
  Meaning: the reproduction end date for a track subject to reproduction limit.
  Function: the date on which reproduction permission specified by EMD is ended.
  Value: same as the notation of the above-mentioned date.

MT (1 byte) (optional)
  Meaning: the maximum number of times reproduction is permitted.
  Function: the maximum number of reproduction times specified by EMD.

Value: from 1 to 0xFF; 0x00 when this is not used. If bit 7 of LT is 0, the value of MT is 00.

CT (1 byte) (optional)

Meaning: the number of times reproduction is made.

Function: the number of times music can be actually reproduced within the permitted number of reproduction times. This value is decremented every time reproduction is made.

Value: 0x00 to 0xFF; 0x00 when this is not used. If bit 7 of LT is 1 and the value of CT is 00, reproduction is inhibited.

CC (1 byte)

Meaning: COPY CONTROL.

Function: copy control.

Value: as shown in FIG. 20, bit 6 and bit 7 represent copy control information, bit 4 and bit 5 represent copy control information associated with high-speed digital copy, and bit 1, bit 2, and bit 3 represent a copy attribute, bit 0 being undefined.

Example of CC:
Bit 7 . . . 0: copy protected, 1: copy enabled.
Bit 6 . . . 0: original, 1: first generation or higher.
Bits 5, 4 . . . 00: copy protected, 01: copy first generation, 10: copy enabled.
Bits 3, 2, 1
  001: content recorded from original source.
  010: content copied from LCM.
  011: content moved from LCM.
  100 or higher: undefined.

It should be noted that LCM stands for Licensed Compliant Module, which is equivalent to the HDD in a personal computer or a consumer device for example.

For example, in digital recording from a CD, (bits 7, 6) are 01, (bits 5, 4) are 00, and (bits 3, 2, 1) are 001 or 010.

CN (1 byte) (optional)

Meaning: the number of times copy is permitted in high-speed digital copy HSCMS (High Speed Serial Copy Management System).

Function: CN extends distinction between copy once and copy free and specifies by the number of times; CN is valid only for first generation copy and decrements every time copy is made.

Value: 00: copy protected, 01 to 0xFE: number of times, 0xFF: infinite number of times.

In the attribute header in the data file, the above-mentioned track information area TRKINF is followed by 24-byte data starting from 0x0370 called a part information area PRTINF for part management. When one track is constituted by plural parts, PRTINFs are arranged along time axis. The following describes the data contained in PRTINF in the order of arrangement.

PRTSIZE (4 bytes)

Meaning: a part size.

Function: PRTSIZE indicates the size of a part; cluster: 2 bytes (top), start SU: 1 byte (middle), end SU: 1 byte (bottom).

Value: cluster: from 1 to 0x1F40 (8000), start SU: from 0 to 0xA0 (160), end SU: from 0 to 0xA0 (160) (SUs are numbered from 0).

PRTKEY (8 bytes)

Meaning: a value for encrypting a part.

Function: an initial value=0; at the time of editing, PRTKEY follows editing rules.

Value: from 0 to 0xFFFFFFFFFFFFFFFF.

CONNUM0 (4 bytes)

Meaning: a first created content accumulation number key.

Function: CONNUM0 serves as the ID for making content unique.

Value: same as the content accumulation number initial value key.

The attribute header of the ATRAC3 data file contains additional information INF as shown in FIG. 18. This information is generally the same as the additional information INF-S (refer to FIG. 12) in the reproduction management file except that the start position is not fixed. Using the position next to the last byte portion (in unit of 4 bytes) of one or more parts as a start position, the data of the additional information INF start.

INF

Meaning: the additional information data associated with tracks.

Function: variable-length additional information data with header. Plural different kinds of additional information may be arranged. Each header is attached with ID and data size. The additional information data including individual headers are at least 16 bytes long and increment in an integral multiple of 4 bytes.

Value: same as additional information INF-S in the reproduction management file.

The above-mentioned attribute headers are followed by the data of blocks to which ATRAC3 data are recorded. As shown in FIG. 8 a header is attached to each block. The following describes the block data with reference to FIG. 18.

BLKID-A3D (4 bytes)

Meaning: BLOCK ID FILE ID.

Function: BLKID-A3D identifies the beginning of ATRAC3 data.

Value: fixed value="A3D" (for example, 0x41334420).

MCode (2 bytes)

Meaning: MAKER CODE

Function: MCode identifies the maker and model of the device on which recording has been made.

Value: high-order 10 bits (maker code); low-order 6 bits (model code).

CONNUM0 (4 bytes)

Meaning: a first created content accumulation number.

Function: CONNUM0 serves as the ID for making content unique and allows no value change after editing.

Value: same as the content accumulation number initial value key.

BLOCK SERIAL (4 bytes)

Meaning: a serial number attached to each track.

Function: the first block starts with 0, subsequent blocks having serial numbers in increment of 1; these numbers remain unchanged after edit processing.

Value: from 0 to 0xFFFFFFFF.

BLOCK-SEED (8 bytes)

Meaning: one key for encrypting one block.

Function: the start block is a security block for the recording device and generates random numbers. The following blocks are numbered in increment of one. If this value is lost, no sound is outputted for about one second equivalent to one block. Therefore, the same value is written to the header and the block end in a duplicate manner. The value is not changed after editing.

Value: initially, 8-byte random number.
INITIALIZATION VECTOR (8 bytes)
Meaning: this is an initial value necessary for encrypting and decrypting ATRAC3 data for each block.
Function: the first block starts from 0 and the next block has a last encrypted 8-byte value of the last SU. When starting halfway in a divided block, the last 8 bytes immediately before the start SU are used. This value is not changed after editing.
Value: from 0 to 0xFFFFFFFFFFFFFFFF.
SU-nnn
Meaning: sound unit data.
Function: data obtained by compressing 1,024 samples. The number of bytes of the data depends on the compression mode used. The value is not changed after editing (for example, N=384 bytes in SP mode).
Value: ATRAC3 data value.

In FIG. 18, N=384, so that 42 SUs are written to one block. The first two slots (4 bytes) of one block form a header. BLKID-A3D, MCode, CONNUM0, and BLOCK SERIAL are written to the last one slot (2 bytes) in a duplicate manner. Therefore, the remaining area M of one blocks is (16,384−384×42−16×3=208 (bytes). As described above, the 8-byte BLOCK SEED is written to this area M.

4. Configuration of a device having a HDD

Recorder 1 compatible with memory 40 described in FIG. 1 may be a stand-alone device or may be incorporated as a component of another device.

In the case of a personal computer having a HDD for example, a recorder for recording data to and reproducing data from memory card 40 may be arranged in the main body of the personal computer. The configuration of the apparatus as shown in FIG. 1 may be employed without changing the main body of the personal computer. Alternatively, a configuration such as that shown in FIG. 21 may be employed in which a CPU 202 directly controls a HDD 201 and memory card 40.

Generally, according to the configuration shown in FIG. 21 encoding/decoding of content data and encryption processing for encrypting data sent to memory card 40 are performed in generally the same manner as performed in recorder 1 shown in FIG. 1. The configuration shown in FIG. 21 will now be described.

In FIG. 21, a digital signal reproduced by a CD player from a CD is stored on a hard disc. The hard disc acts as an audio server. The reproduced digital signal is copied from, or moved from the hard disc to memory card 40 having the above-mentioned format. The signal recorded to memory card 40 may be reproduced therefrom by a recorder/playback device (a stationary or portable recorder) compatible with memory card 40 in the configuration similar to that shown in FIG. 1. This description for copy and move operations is also applicable to stand-alone recorder 1 that may be connected to a personal computer having a HDD.

The apparatus shown in FIG. 21 is a personal computer 200 comprising a HDD 201. A CPU 202 controls HDD 201. CPU 202 is connected to an external non-volatile memory (an external NVRAM) 203, an operation button 204, and a display device 205.

An ATRAC3 audio encoder/decoder 206 is also included in computer 200. An analog input 207 is converted by an A/D converter 208 into a digital audio signal to be compressed in accordance with the ATRAC3 scheme by audio encoder/decoder 206. A digital input 210 from a CD player 209 is supplied to audio encoder/decoder 206 through a digital input receiver 211 to be compressed in accordance with the ATRAC3 scheme. CD player 209 may be either an externally attached CD player or a CD-ROM drive mounted on the personal computer.

Personal computer 200 is adapted to decrypt the content (audio data) stored in HDD 201, decode the decrypted content at audio encoder/decoder 206 into a digital audio signal, and provide an analog audio output 214 through a D/A converter 213.

Compressed audio data received from audio encoder/decoder 206 supplied to a security block 212 in order to be encrypted. The audio data is encrypted in accordance with a content key in a manner similar to that of recorder 1.

Under the control of CPU 202, encrypted ATRAC3 data is stored in HDD 201. If digital data has been input, music identification information such as ISRC and TOC_ID identifiers, other than only audio data, may also be stored. Security block 212 generates a content key and a content accumulation number (CONNUM) for each content (for each data file (or track)) and also designates a serial number unique to each host. These values for the content key, CONNUM and serial number are also stored in HDD 201 and/or external non-volatile memory 203.

In order to reproduce the encrypted ATRAC3 data file stored in HDD 201 by a device other than personal computer 200, the ATRAC3 data file is copied to or moved to memory card 40. When the data file is moved, it is deleted from HDD 201. When the data file is copied, it is still present on HDD 201.

Because the ATRAC3 data is encrypted in accordance with the content key, if the data is copied, the sound cannot be reproduced because the copied data cannot be decrypted. If the content key were to be stolen, however, the data could be easily decrypted. To prevent this problem, the content key itself is encrypted and the encrypted content key is not exposed outside of the computer. For example, when moving content from HDD 201 to memory card 40, the content key is encrypted by a session key and the encrypted content key is transmitted from HDD 201 to memory card 40. Memory card 40 decrypts the content key in accordance with the same session key and then encrypts the content in accordance with a storage key associated with memory card 40 so as to store the encrypted content key into memory card 40.

Similarly, when copying or moving data from memory card 40 to HDD 201, the content key is encrypted in accordance with the session key and the encrypted content key is transmitted along with the encrypted data. The content key recorded in HDD 201 differs from the content key recorded in memory card 40. Thus, for audio data to be decrypted, the encrypted audio data and its corresponding content key must always both be present at the destination device.

As described above, a content key and a content accumulation number (CONNUM) are generated for each portion of the content data. A value obtained by combining the content key and the content accumulation number is used as a content ID, which is unique to each portion of the content data as will be described later. The content key and content accumulation number (CONNUM) are equivalent to the content key and the content accumulation number (CONNUM) included in the track information area TRKINF shown in FIG. 18.

5. Various recording paths to memory card and content supply source identification information The configurations of the file system in the memory card 40 and the recorder 1 have been described so far. The following describes various examples of recording routes along which content is recorded to the memory card 40 loaded in the recorder 1 and the identification information for content supply sources in these examples, with reference to FIGS. 22, 23, and 24.

Figure 23:
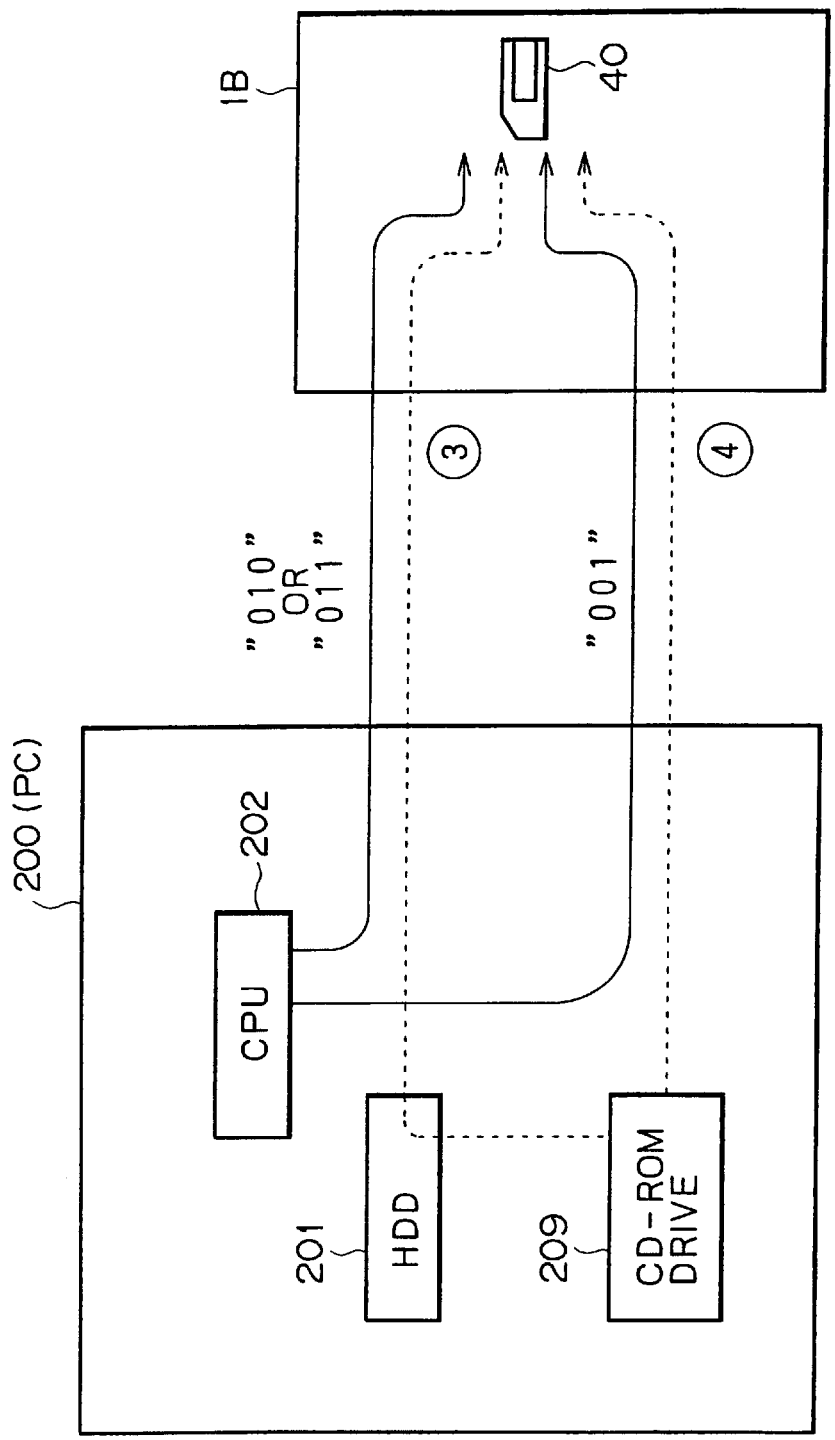
FIG. 23 is a diagram illustrating another example of recording routes to the memory card of the embodiment.

The content supply source identification information is represented in the CC bits 1, 2, and 3 of the attribute header of the above-mentioned data file(refer to FIGS. 18 and 20). In each example, recorders 1A and 1B are equivalent to the recorder 1 shown in FIG. 1. Referring to FIGS. 22 through 24, a dashed line denotes the flow of content, while a solid line denotes the flow of the identification information.

FIG. 22 shows data routes in the case where content such as music data reproduced from a CD and transmitted from a reproduction apparatus 200 such as a CD player for example is recorded in the memory card 40.

A route 1 is formed when the recorder 1 B formed in a stand-alone configuration for example is connected to the reproduction apparatus 300. In this setup, the reproduction apparatus 300 is connected to the digital input selector 16 or the line input selector 13 of the recorder 1 (1B) shown in FIG. 1 to supply digital audio data or analog audio data from the reproduction apparatus 300 to the recorder 1, by way of example.

The data as content supplied from the reproduction apparatus 300 are encoded and encrypted in the recorder 1B as described with reference to FIG. 1 to be stored in the memory card 40. Namely, content as one piece of music is recorded as one data file.

In this example, because the content is reproduced from a CD, which is a playback-only recording medium, and inputted from the digital input selector 16 or the line input selector 13, a DSP 30 of the recorder 1B generates "001" as values of bits 1, 2, and 3 of "CC" as the content supply source identification information, which are recorded in the attribute header of the data file. It will be apparent that as the content is recorded, the other control information in the data file and the reproduction management file are recorded and/or updated (this holds true with the following examples).

A route 2 shown in FIG. 22 is formed in the case of the recorder 1A incorporated in the apparatus 200, which is a personal computer or an audio/visual apparatus. The apparatus 200 is connected to the reproduction apparatus 300, from which digital audio data or analog audio data are directly supplied to the recorder 1A.

In this case too, the data as content supplied from the reproduction apparatus 300 are encoded and encrypted in the recorder 1A to be recorded in the memory card 40. Namely, the content as one piece of music is recorded as one data file.

In this case, the CPU 202 controlling the apparatus 200 generates "001" as values of bits 1, 2, 3 of "CC" as the identification information of the content supply source and supplies the generated values to the recorder 1A. By use of the supplied "CC" and other necessary information, the recorder 1A records the management information in the data file and records and/or updates the reproduction management file.

FIG. 23 shows data routes in the case where content, music data reproduced from a CD for example, supplied from the CD-ROM drive 209 incorporated in the apparatus 200 as a personal computer for example is recorded to the memory card 40.

The recorder 1B in a stand-alone configuration for example is connected to the apparatus 200 by USB or another communication scheme through the terminal 32 shown in FIG. 1.

A route 3 is formed when the content reproduced by the CD-ROM drive 209 is stored once in the HDD 201 and then is supplied from the HDD 201 to the recorder 1B.

The data as the content supplied from the HDD 102 may be copied or moved in the recorder 1 B to the memory card 40. In this case, because the data are copied or moved from the HDD 201, the CPU 202 of the apparatus 200 for controlling the transmission of content data generates "010" or "011" as values of bits 1, 2, and 3 of "CC" for the recorder 1 B and records these values in the attribute header of the data file.

A route 4 shown in FIG. 23 is formed when the content reproduced by the CD-ROM drive 209 is supplied directly to the recorder 1B. The content data supplied from the CDROM drive 209 are recorded to the memory card 40 in the recorder 1B.

In this case, because the data are recorded from a CD, the CPU 202 of the apparatus 200 for controlling the transmission of content data generates "001" as values of bits 1, 2, and 3 of "CC" for the recorder 1B and records these values to the attribute header of the data file.

FIG. 24 shows the case in which the apparatus 200 such as a personal computer downloads content provided by a server 400 into the HDD 201 through a general communication line such as ISDN for example, a satellite communications line, or any other transmission path. The apparatus 200 is also connected to the recorder 1B. The recorder 1B is connected to the apparatus 20000 through the terminal 32 shown in FIG. 1 by a USB connection or another communication scheme.

The contents provided by the server and stored in the HDD 201 is supplied to the recorder 1B. In this case, the data as content supplied from the HDD 201 are copied or moved in the recorder 1 B to the memory card 40.

Because the data are copied or moved from the HDD 201 in this case, the CPU 202 of the apparatus 200 for controlling the transmission of content data generates "010" or "011" as values of bits 1, 2, and 3 of "CC" for the recorder 1 B and records these values in the attribute header of the data file. As described, values "100" and higher are undefined. As for the content captured through a transmission path for example, it is possible to assign a value "100" or higher. In such a case, CC is "100" or higher.

It should be noted that the examples shown in FIGS. 22, 23, and 24 are only typical examples among various content recording routes; therefore, many other routes are possible.

In each example, the values of bits 1, 2, and 3 of "CC" that provides the identification information for the content supply source are transmitted to the recorder 1 from the apparatus from which the content has been supplied to the recorder 1 or are generated by the DSP 30 in the recorder 1.

6. Processing for copy and move operations

The following discussion describes content data copying and movement operations mainly between memory card 40 and HDD 201.

First, an example of processing steps during recording/reproducing and transferring of content data between memory card 40 and HDD 201 during copy and move operations will be described referring to FIGS. 25 through 28. Then, an example of the data flow during copy and move operations in accordance with the processing shown in FIGS. 25 through 28 will be described with reference to FIGS. 29 through 31.

FIGS. 25 through 28 depict control processing by a recording/reproducing system including HDD 201 and memory card 40. This control processing may be executed by various entities.

For example, in a system where a personal computer having HDD 201 is connected to stand-alone recorder 1, it is possible that the CPU of the personal computer executes the processing (refer to FIGS. 25 and 26) associated with HDD 201 and DSP 30 of recorder 1 executes the processing (refer to FIGS. 27 and 28) associated with memory card 40. In this case, during processing DSP 30 and the personal computer transfer various pieces of predetermined required control information, as described below. These pieces of information may include an indication of a distinction between a copy and a move operation, the value of identification information, content ID, and copy count value, for example.

Figure 27:
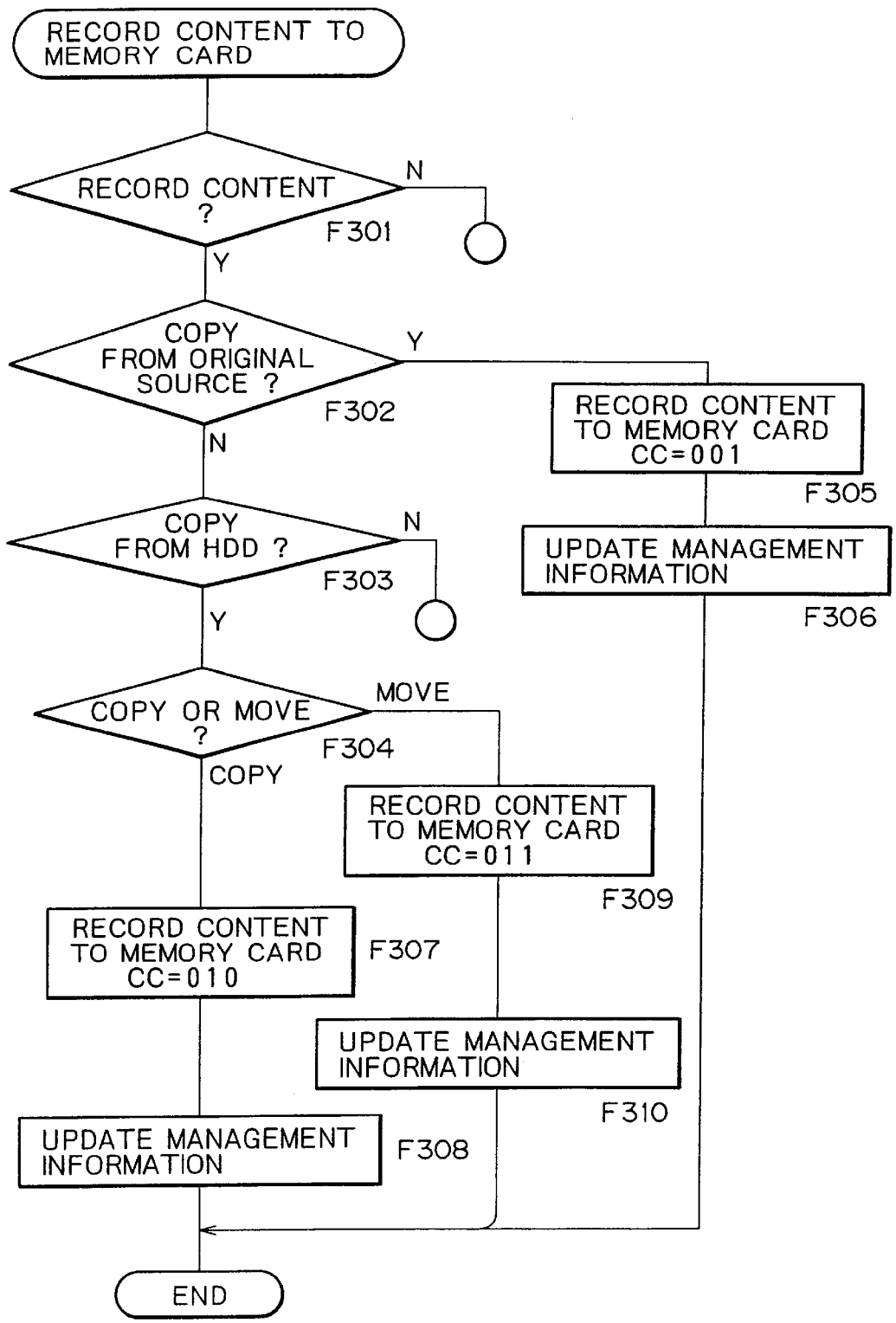
FIG. 27 is a flowchart for depicting the recording of content to the memory card of the embodiment.
Figure 28:
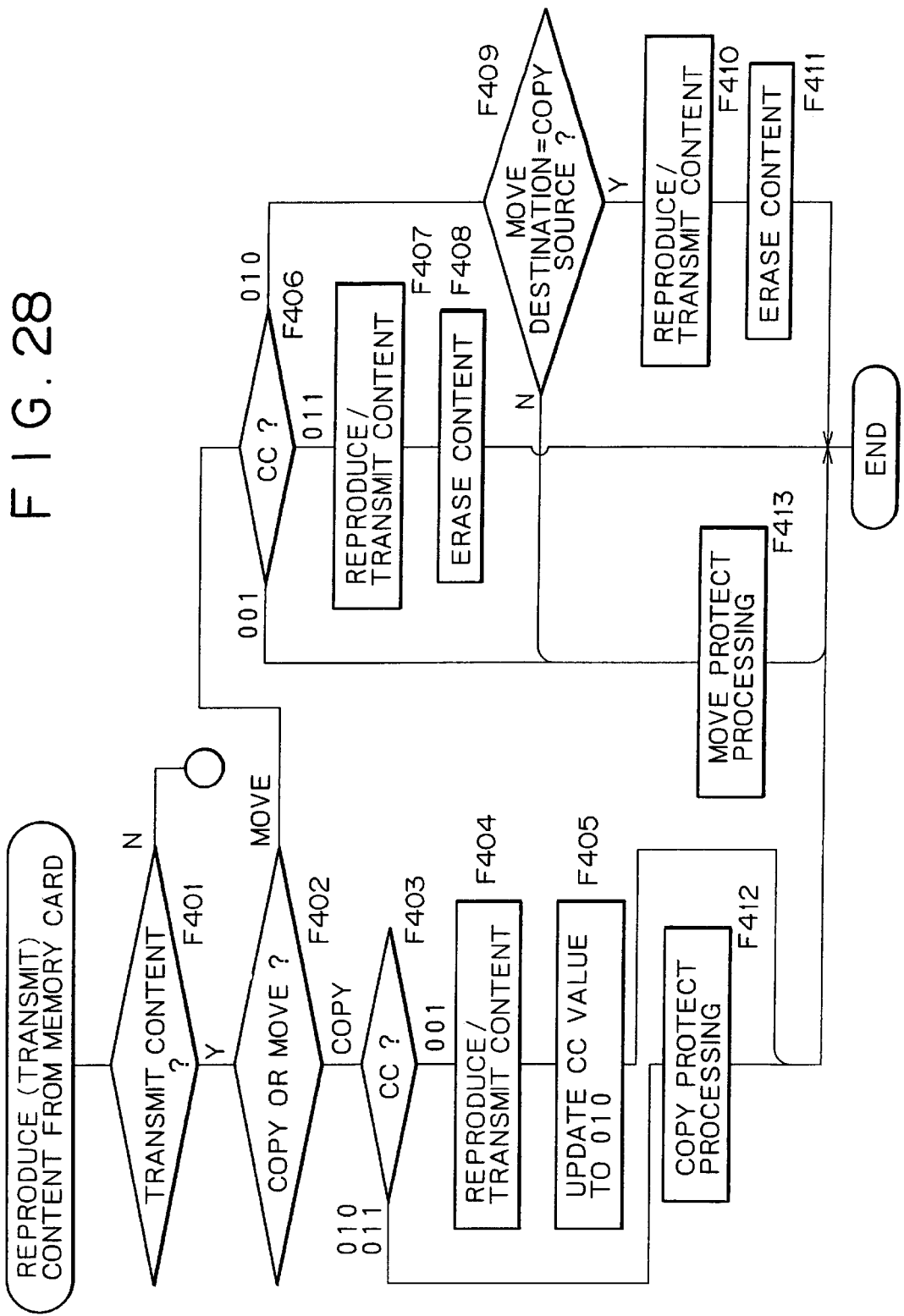
FIG. 28 is a flowchart depicting the transmitting of content from the memory card of the embodiment.

Alternatively, in a system where a personal computer is connected to recorder 1, the personal computer may execute all control operations including the control shown in FIG. 27 and 28 with respect to memory card 40, and send its commands to the DSP 30 for execution or vice versa.

Given a system formed in the personal computer 200 as shown in FIG. 21, all control operations shown in FIGS. 25 through 28 may be executed by the CPU 202.

Figure 25:
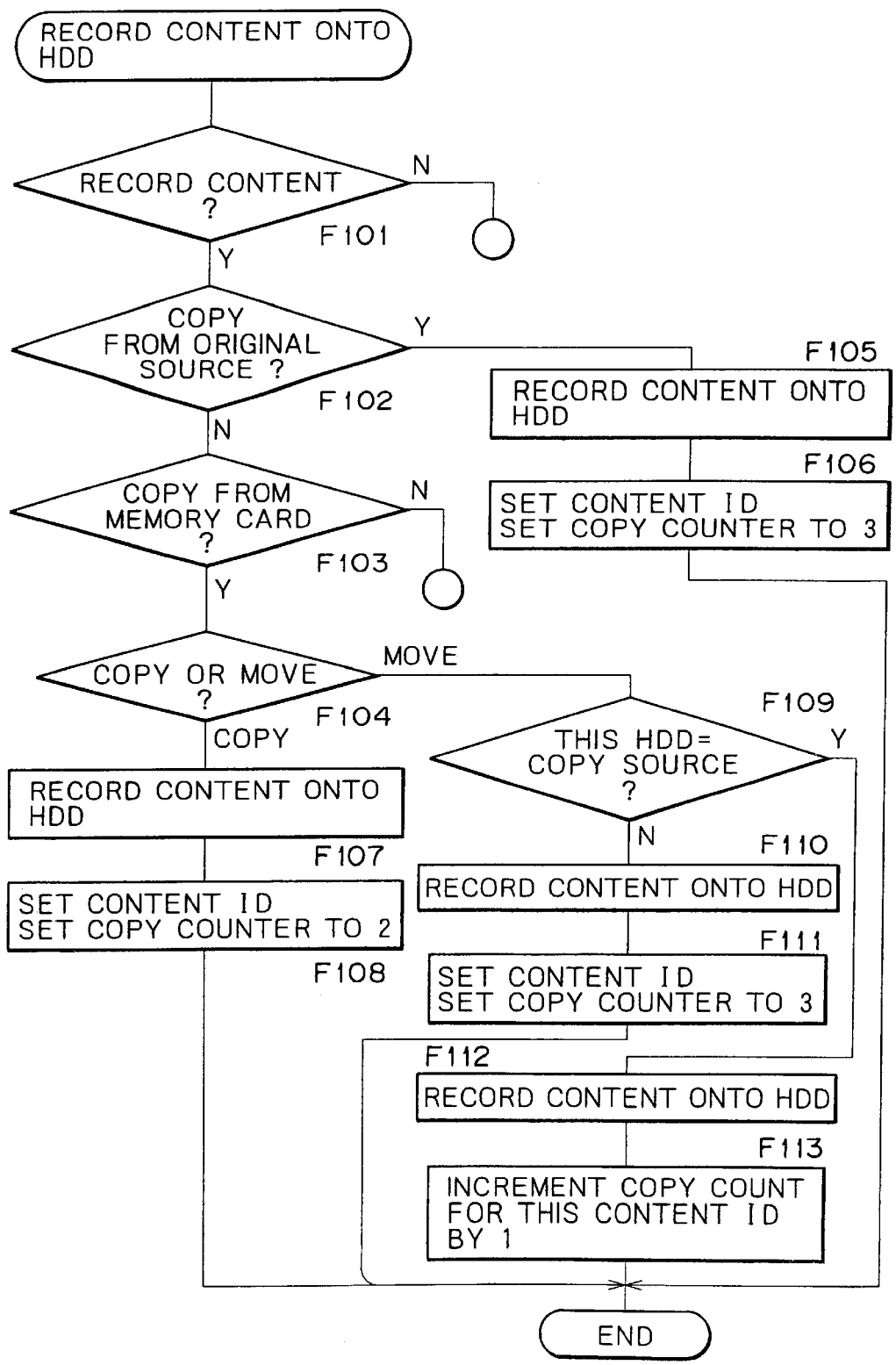
FIG. 25 is a flowchart depicting the recording of content to the HDD of the embodiment.

FIG. 25 shows processing to be executed when content data is to be stored in HDD 201. In accordance with the figure, the user gives a command for recording content reproduced from a reproduction-only recording medium such as a CD, or content supplied from server 400 through the transmission path shown in FIG. 24 to HDD 201. The user may alternatively give a command for copying or moving content from memory card 40. In either case, control passes from step F101 to step F102 as the system determines that there is a request to record content. Then at step F102, the system determines whether the content to be recorded is a copy of content data from an original source. An original source includes a reproduction-only recording medium such as a CD. In the present embodiment, server 400 is also considered an original source.

If it is determined that the content has been reproduced from an original source, control of the system passes to step F105, and the desired content is recorded to HDD 201. Once the content has been recorded to HDD 201, then, in step F106, the system generates a content ID unique to the recorded content and also sets a copy counter as part of the content ID. The content ID and the copy count value are stored in HDD 201 corresponding with the recorded content. The content ID is a value obtained by combining a content key and content accumulation number (CONNUM) for example as described above. In the system of the present embodiment, if HDD 201 is used as a personal server and content is to be copied to another recording medium (i.e. memory card 40), the content may be copied up to three times, by way of example. The copy counter denotes a value indicating the remaining number of times the content may be copied. Therefore, if the system has proceeded to step F106 because the content is a copy from the original source, and no further copies from HDD 201 have been made, the copy counter value is set to 3.

When the recording of the content data, the content ID, and the copy counter to HDD 201 has been completed, control passes to end.

If at step F102 it is determined that the content data to be recorded has not been reproduced from an original source, control passes to F103, where it is determined whether the source of the indicated content data is memory card 40, i.e. whether recording of data stored in memory card 40 has been requested. If it is requested that the recording take place from memory card 40, control passes to step F104 where it is determined whether the recording is in accordance with a copy operation or a move operation.

If it is requested that the content be copied from memory card 40, control passes to step F107, and the desired content data from the memory card 40 is copied to HDD 201. In step F108, the system then sets the content ID and the copy counter corresponding to the recorded content and stores this data into HDD 201. After copying, the same content exists on both HDD 201 and memory card 40, which is equivalent to the copying of the content from HDD 201 to memory card 40 once. Therefore the content is considered already copied once, and the copy counter is set to 2. After recording of the content, the content ID corresponding to the content, and the copy counter to HDD 201, processing ends.

If, at step F104, it is determined that a request was made to move the content data from memory card 40, control passes to step F109 where it is determined whether HDD 201 is the source from which content has been transferred to memory card 40 in the past. In order to determine whether HDD 201 is the copy source, the content ID of the content to be copied to HDD 201, that has been previously set, is compared to a content ID list of HDD 201. If there is a match, it is determined that HDD 201 is the content data source source.

If at step F109 the content ID of the content data to be recorded to HDD 201 is not found on HDD 201, it is determined that HDD is not the copy source. Control then passes to step F110, and the content data supplied from memory card 40 is stored on HDD 201 at step F110. As a move operation, the content is erased from memory card 40. This move operation will be described in greater detail below. Thereafter, control passes to step F111 where the system sets the content ID and the content counter corresponding to the recorded content data and stores these values in HDD 201. Because new content has been moved to HDD 201, and the content does not exist on memory card 40 any more, the value of the copy counter is set to 3.

In accordance with the move operation for moving content data from memory card 40 which is not an original source, it is also possible to inhibit any further copying of the recorded content data from HDD 201. In order to implement such an inhibition, the value of the copy counter is set to 0. When the recording of the content, the content ID, and the copy counter to HDD 201 has been completed, processing ends.

If, in step F109 it is determined that HDD 201 is the copy source (i.e. if the content ID of the content to be recorded to HDD 201 is found on HDD 201), control passes to step F112 to record the content data from memory card 40 to HDD 201, and the content data is erased from memory card 40. In most cases, the content data is already present in HDD 201 (because it was the original source of the content data), so that the actual recording operation is not required. The actual recording operation is only executed when, after the content data is first copied from HDD 201 to memory card 40, the content data is moved to another memory card 40, or otherwise removed from HDD 201, and therefore the content data no longer exists on HDD 201.

Control then passes to step F113, and the content ID and the copy counter corresponding with the content data are set and stored on HDD 201. The content that was copied from HDD 201 to the memory card 40 has been returned to HDD 201. Therefore, the number of memory cards on which the content data is present decreases by one, so that the value of the copy counter is incremented by one (+1) so that one additional copy may be made. When the updating of the copy counter has been completed, processing ends.

Figure 26:
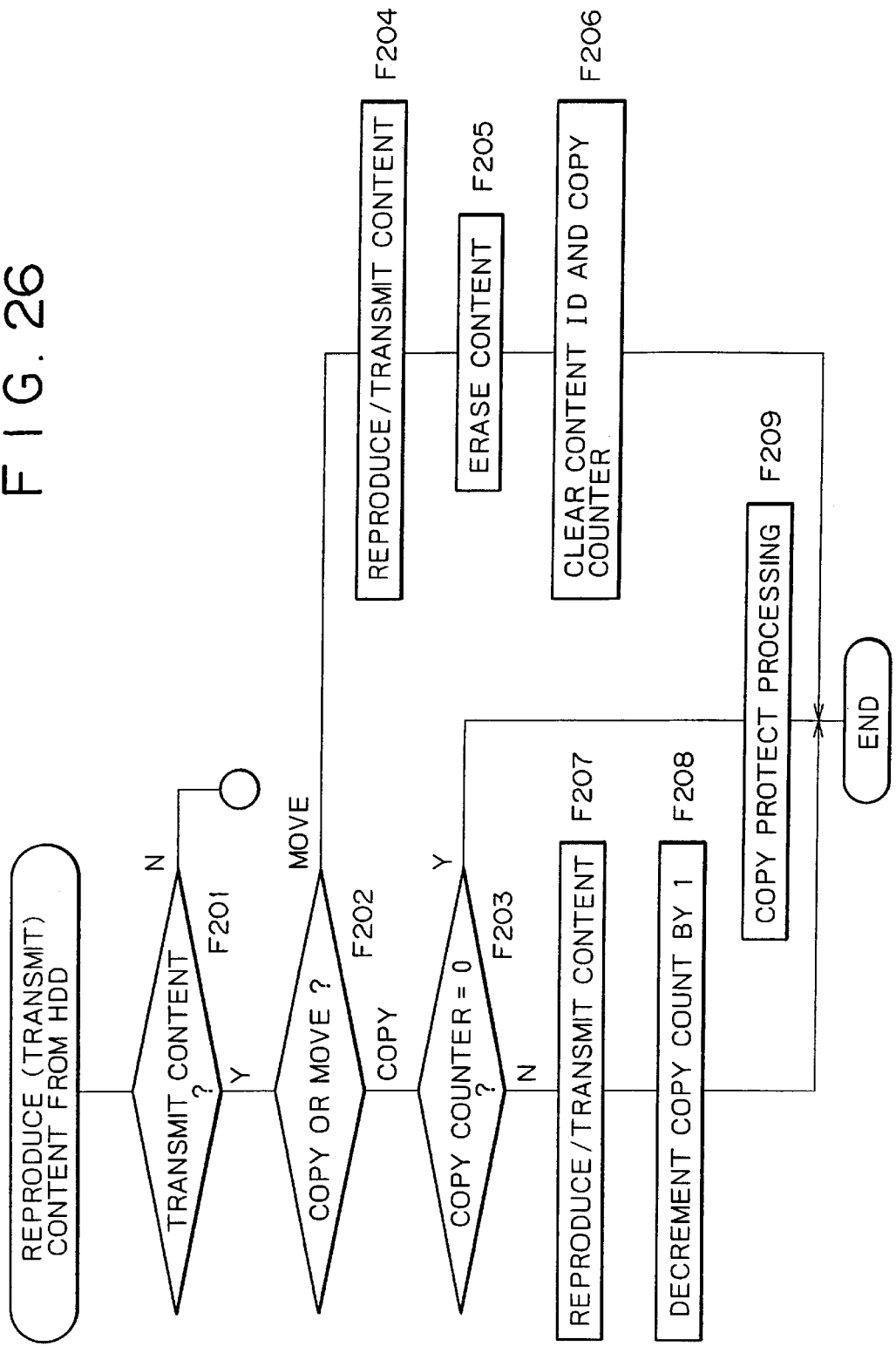
FIG. 26 is a flowchart depicting the transmission of content from the HDD of the embodiment.

Referring next to FIG. 26, the copying or moving of content data from HDD 201 to memory card 40 will be described. When the user gives a command for copying or moving content data from HDD 201 to memory card 40, control passes from step F201 to step F202. At step F202 it is determined whether the requested process is a copy or a move operation. If the requested operation is a copy operation, in step F203, the value of the copy counter stored for that content is determined.

If it is determined that the value of the copy counter is 3, 2, or 1 rather than 0, a copy is permitted. Therefore, control passes to step F207 and the content data is reproduced and transmitted to memory card 40. Memory card 40 records the supplied content data. Then, after control passes to step F208, the copy counter is decremented by one (−1) to indicate that one less copy is available to be made from HDD 201. For example, the value of the copy counter, which is 3 so far, is decremented to 2. Once the transmission of content data and the updating of the copy counter have been completed, processing ends.

In accordance with a preferred embodiment of the present embodiment, the number of times content data is permitted to be copied from HDD 201 is 3. Each time the content data is copied, the value of the copy counter is decremented. Consequently, if content has already been copied from HDD 201 three times, the value of the copy counter will be 0.

Therefore, if at step F203 it is determined that the value of the copy counter is 0, no more copying of the content data from HDD 201 is permitted. Control then passes to step F209 to execute copy protect processing.

The system will therefore not allow the content data to be transmitted from HDD 201 to memory card 40, and the system notifies the user of such a copy prohibition. A message may be shown in the display device of the personal computer 200 for example, telling the user that the content has already been copied 3 times. Alternatively, the system may notify the user of such a copy prohibition with an alarm tone or an alarm message.

If at step F202 it is determined that the user has requested moving certain content data from HDD 201 to memory card 40, control passes to step F204. At step F204 the requested content data is transferred to memory card 40 where it is recorded. The system also erases the transmitted content data from HDD 201 in step F205, in accordance with the move command. Then, in step F206, after the content data is erased from HDD 201, the system also clears from HDD 201 the stored content ID and the copy counter associated with the moved content data.

In some cases, it may be desirable that the system not clear the content ID and the copy counter in step F206. For example, if the content has been copied from HDD 201 to another memory card in the past, the content may sometimes be returned to HDD 201 by a moving operation from the other memory card. Namely, the processing operations of steps F112 and F113 of FIG. 25 may be performed. If such a copy has been performed in the past, the content ID and the copy counter are required on HDD 201, and are therefore not erased. Therefore, during processing at step F206, if the value of the copy counter is 3, the system clears the content ID and the copy counter from HDD 201. However, if the value of the copy counter is one of 2, 1, and 0, the system retains the content ID and the copy counter on HDD 201.

When the above processing has been completed, processing ends. It should be noted that in an alternative embodiment the clearing of the content ID and the copy counter in step F206 may not be executed regardless of the value of the copy counter. In this manner the content ID and the copy counter may be kept stored on HDD 201 to keep a record of past content included on HDD 201.

Referring next to FIG. 27, processing for recording content data to memory card 40 will be described.

At step F301, it is determined whether a user issues a command for directly recording content data to memory card 40. It is further determined whether this content data is reproduced from a reproduction-only recording medium, such as a CD, supplied from server 400 via a transmission path including HDD 201. Additionally, it is determined whether a user issues a command for copying or moving content data from HDD 201 to the memory card 40. If any of these inquiries are answered in the affirmative, control passes from step F301 to step F302.

At step F302 it is determined whether the requested content is to be copied from an original source. An original source denotes a reproduction-only recording medium such as a CD. In the present embodiment, an original source also includes server 400. If it is determined at step F302 that the content is copied from an original source, control passes to step F305 to record the requested content data to memory card 40. As described with reference to FIG. 18, management information, such as attribute header and block headers, is added to the data file to be transferred. The values of the copy attribute of CC bits 1, 2, and 3 to be recorded in the attribute header of the data file are set to "001", indicating that this recording is from an original source (refer to FIG. 20). After the content data is recorded at step F305, the reproduction management file is updated in step F306 (see FIG. 12). The transmitted content data is recorded in memory card 40 as one data file. After the updating of the reproduction management file for this recording operation has been completed, processing ends.

If at step F302 it is determined that the content data is not being provided from an original source, control passes to step F303, where it is determined whether the requested content data is to be transferred from HDD 201. If the requested content data is found to reside on HDD 201, it is further determined in step F304 whether a copy or a move operation has been requested. If it is determined that a copy operation has been requested, control passes to step F307 where the requested content data from HDD 201 is transferred to memory card 40. In the recorded data file the values of the copy attribute of CC bits 1, 2, and 3 in the attribute header are set to "010", indicating that this recording was made in accordance with a copying operation from HDD 201. The reproduction management file is then updated in step F308. The content data transmitted from HDD 201 is recorded to memory card 40 as one data file. When the updating of the reproduction management file corresponding to this particular recording has been completed, processing ends.

If, it is determined in step F304, that a move operation has been requested, the content data supplied from HDD 201 is recorded to memory card 40 in step F309. At this time, in the recorded data file, the values of the copy attribute of CC bits 1, 2, and 3 in the attribute header are "011", indicating that this recording operation included a moving of content data from HDD 201. The reproduction management file is then updates in step F310, and processing.

Referring next to FIG. 28, processing for reproducing content data from memory card 40 and copying or moving the content data from memory card 40 to HDD 201 will be described.

When a user requests the copying or moving of content data from memory card 40 to HDD 201, processing passes from step F401 to step F402, where it is determined whether the request is for a copy operation or a move operation. If it is determined at step F402 that a copy operation has been requested, the values of the CC bits 1, 2, and 3 of the attribute header in the data file corresponding to the requested content data are checked. In the present embodiment, at step F403 if it is determined that the CC bit values 1, 2, and 3 are "001", namely if the data file on memory card 40 corresponding to the requested content data was previously transferred to memory card 40 from an original source, the content can be copied only once. Control then passes to step F404 and the data file is transmitted to HDD 201. At this same time, on the side of HDD 201, the system is executing the processing of step F107 and step F 108 of FIG. 25, recording the provided content data and setting the content ID and the copy counter.

Control then passes to step F405 where the values of CC bits 1, 2, and 3 of the data file to be processed are updated to read to "010", in response to the copy operation performed at this time. This copy operation has consumed the one permitted copy of this content data. Thus, the same content data exists on both HDD 201 and memory card 40. Consequently, the same condition as that in which content has been copied from HDD 201 to memory card 40 exists. Therefore, the above update operation is performed in order for the data file in question in memory card 40 to be considered as if it had been copied from HDD 201.

When the transmission of the content data and the updating of the CC values have been completed, processing ends. In the present embodiment, copying content data from memory card 40 is permitted only when the data file corresponding to the requested content data has been obtained from an original source. Therefore, if it is determined in step F403 that the CC for the data file in question is "010" or "011", copying thereof is not permitted. Processing therefore continues at step F412, and copy protection processing is executed. The data file in question is not reproduced, and the user is notified that the copy operation is prohibited.

If it is determined at step F402 that the user has requested movement of a particular content data from HDD 201 to memory card 40, processing proceeds from step F402 to step F406, wherein the values of CC bits 1, 2, and 3 of the attribute header in the data file to be processed are checked. If the values of CC bits 1, 2, and 3 are "011", indicating that the content data was previously moved from HDD 201 to memory card 40, control passes to step F407. A moving operation moving content data from memory card 40 to HDD 201 is not restricted. Therefore the requested data file is transmitted to HDD 201. At the same time on the side of HDD 201, the system executes the processing of step F110 and step F111 shown in FIG. 25. Because a moving operation is employed, reproduced data file from the memory card 40 is erased therefrom in step F408. Updating the reproduction management file effects the erasing operation. When the above processing has been completed, processing ends.

If at step F406 it is determined that the values of CC bits 1, 2, and 3 are "010", the requested data file has been copied from a particular HDD 201. The requested data file may only be moved from memory card 40 to the particular HDD 201 from which the data file was previously copied. Therefore, control passes to step F409 where it is determined whether HDD 201 currently specified as the destination of the move operation is the source from which the requested data file was originally copied to memory card 40, i.e. the content ID of the requested content data is looked for on HDD 201. If HDD 201 to which the content is to be moved is determined to be the copy source, processing passes to step F410, and the data file is transmitted to HDD 201. At the same time on the side of HDD 201 the system executes the processing of step F112 and step F113 shown in FIG. 25. Then, at step F408 the reproduced data file is erased from memory card 40. Updating the reproduction management file effects the erasing operation. When the above processing has been completed, processing ends.

If at step F406 it is determined that the values of CC bits 1, 2, and 3 are "001", indicating that the requested data file was transferred from an original source to memory card 40, control passes to step F413, the requested move operation is not allowed, and move protect processing is implemented. The system does not transmit the data file from memory card 40 to HDD 201 and notifies the user that the move operation is prohibited.

7. Examples of copy and move operations

The following control operations (a) through (d) are realized by the abovementioned processing operations shown in FIGS. 25 through 28.

(a) Content recorded on a HDD can be copied to a memory card up to three times. The content copied from a memory card to a HDD can then be copied from the HDD up to two times.

(b) Content copied from a HDD to a memory card can be moved only to the HDD from which the content has been copied. The copying of this content from the memory card is prohibited. If, under this condition, the content copied from the HDD to the memory card is moved in return from the memory card to the HDD from which it has been copied, the number of times a copy can be made from the HDD (the copy counter) is incremented.

(c) Content recorded from an original source directly to a memory card can be copied to a HDD only once but cannot be moved.

(d) Content moved from a HDD to a memory card can be moved thereafter to another storage medium.

Under these conditions, copying of content data is permitted so that the content data may exist on one HDD and three memory cards. Moving of content between recording media is not restricted as long as this condition is met Referring next to FIGS. 29–31 control of copy and move operations will now be described. Each of these figures schematically illustrates the flow of content between an original source such as a CD, a memory card 40, and a HDD 201. CC values are updated and set as the content flows, the ID of the content, and the values of copy counter are also modified.

It should be noted that, in the following description of FIGS. 29–31, the corresponding steps from FIGS. 25–28 are indicated.

Figure 29:
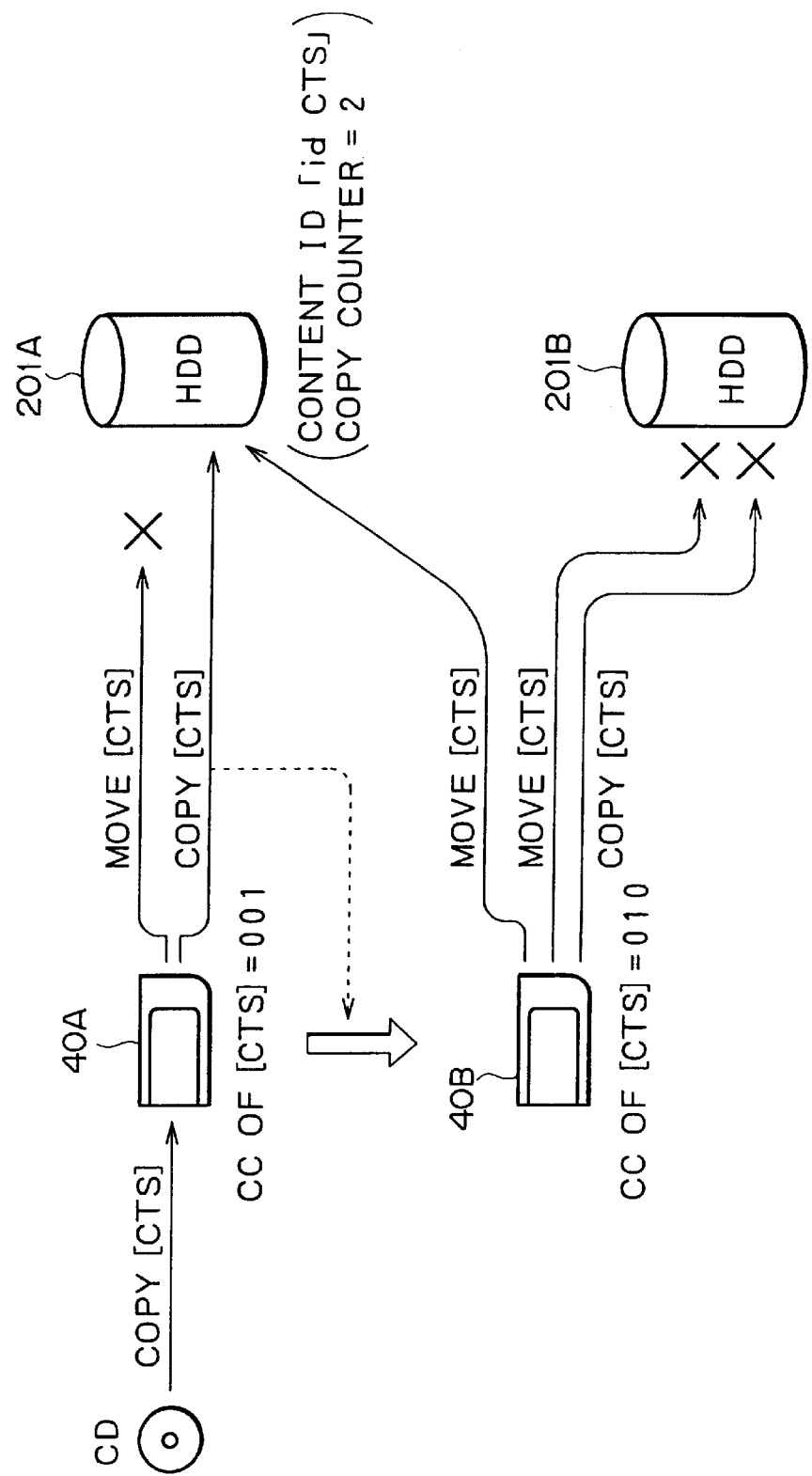
FIG. 29 is a diagram illustrating copying and moving operations of the embodiment.

FIG. 29 shows an example in which certain content (CTS) obtained from an original source such as a CD is copied directly to a certain memory card 40A. The values of CC bits 1, 2, and 3 of the data file in memory card 40A based on this content (CTS) are "001" (steps F305 and F306). In this state, moving of the content (CTS) from memory card 40A to a certain HDD 201A is prohibited (steps F406 to F413) but copying of this content is permitted (steps F403 to F404).

When the content (CTS) has been copied from memory card 40A to HDD 201A, the content ID "idCTS" of the content (CTS) in the HDD 201A is set. The value of copy counter is set to 2 (steps F107 and F108). This is because the same state as that in which the content has been copied once from HDD 201A to the memory card 40 is present. So that the data file in memory card 40A is regarded as having been copied from HDD 201A, the values of CC bits 1, 2, and 3 of the data file in memory card 40A based on the content (CTS) are updated to "010" (step F405).

Thus, after updating of the CC bits in memory card 40A to "010", the content (data file) is permitted only to be moved from memory card 40A to the HDD 201A which is regarded as the original source from which the data in memory card 40A was copied (steps F409 to F410, F109 to F112). Although not shown in FIG. 29, if the content is moved back to HDD 201 A, the value of the copy counter therein is incremented (step F113). The data file is erased from memory card 40A (step F411). The content (data file) for which the CC bits have been updated to "010" in the memory card 40A is prohibited from being copied or moved to another HDD 201B (steps F403 to F412, F409 to F413).

Figure 30:
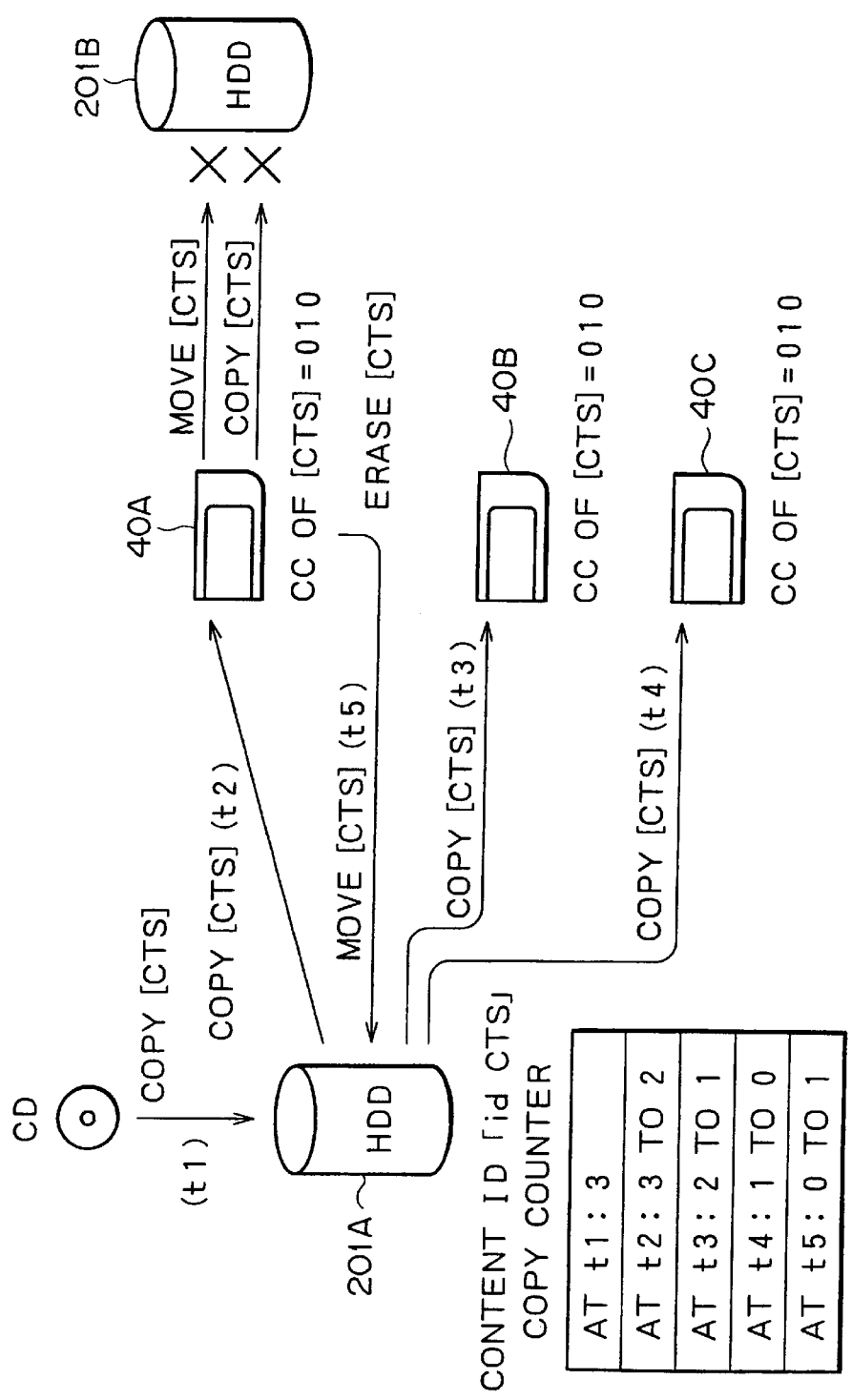
FIG. 30 is a diagram illustrating other copying and moving operations of the embodiment.

FIG. 30 shows an example in which a certain content (CTS) obtained from an original source has been copied to a HDD 201A. At this time point tI when the content has been copied, the content ID "idCTS" of the copied content (CTS) is set in HDD 201A and the value of the copy counter is set to 3 (steps F105 and F106). If the content (CTS) is then copied into memory card 40A at time point t2, the value of the copy counter for content (CTS) in HDD 201A is set to 2 (steps F207 and F208). At memory card 40A, the content (CTS) is recorded as a data file and the CC bits of this data file are set to "010" (steps F307 and F308).

At a further time point t3, copying of the content (CTS) from HDD 201 A to another memory card 40B is also permitted. The value of the copy counter of the content (CTS) at HDD 201A is set to 1 (steps F207 and F208).

At a next time point t4, copying of the content (CTS) from HDD 201A to still another memory card 40C is also permitted. The value of the copy counter of the content (CTS) at HDD 201A is updated to 0 (steps F207 and F208). At memory card 40C, this content (CTS) is recorded as a data file and the CC bits of this data file are set to "010" (steps F307 and F308).

Thus, once the content (CTS) has been copied to three memory cards 40A, 40B, and 40C at time points t2, t3, and t4 respectively, the copying of this content to another memory card is prohibited (steps F203 to F209). Copying or moving of the content (CTS) copied from HDD 201A to the memory card 40A (or 40B or 40C) to another HDD 201B therefrom is also disabled (steps F403 to F412, F409 to F413). However, moving of this content from one of memory cards 40A, 40B or 40C back to HDD 201 A, which is the copy source, is permitted (steps F409 to F410).

Therefore, for example, if at time point t5 the content (CTS) is moved from memory card 40A back to HDD 201A (steps F409 to F410), the value of the copy counter of the content (CTS) at HDD 201A is updated to 1 (steps F112 and F413. The data file is erased from memory card 40A (F411).

Figure 31:
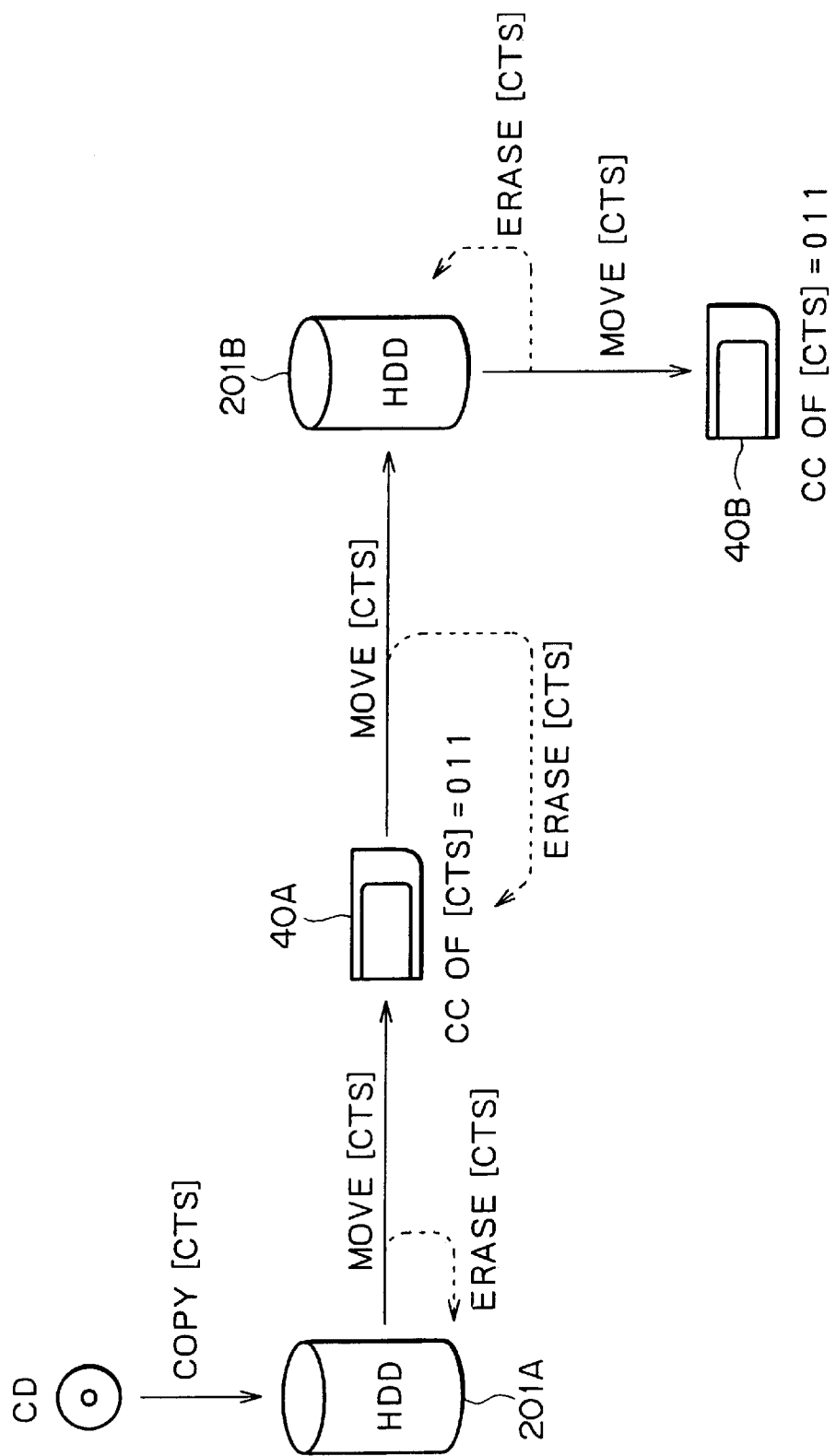
FIG. 31 is a diagram illustrating still other copying and moving operations of the embodiment.

Referring next to FIG. 31, a certain content (CTS) obtained from an original source is copied to HDD 201A and then moved. When the content (CTS) recorded in HDD 201A is moved to memory card 40A, the content (CTS) is erased from the HDD 201A (steps F204, F205, F206). This content (CTS) is recorded as a data file at memory card 40A and the CC bits of this data file are set to "011" (steps F309 and F310). For this content moved from the HDD to memory card 40, the moving of this contents (CTS) to another HDD is not disabled (steps F406 to F407). Therefore, if the content (CTS) is moved from memory card 40A to another HDD 201B for example, the data file including this content (CTS) is erased from memory card 40A (step F408). This content (CTS) is recorded at HDD 201B and the content ID and the copy counter are set (steps F110 and F111). Further, if the content (CTS) recorded to HDD 201B is then moved to memory card 40B, this content (CTS) is erased from HDD 201B (steps F204, F205, F206). This content (CTS) is recorded as a data file at memory card 40B and the CC bits of this data file are set to "011" (F309 and F310). Thus, moving can be executed between HDD 201 and memory card 40 any number of times, provided that there is always only one copy of the content (CTS).

Consequently, copy and move operations can be properly permitted or inhibited according to prior types of transfer, copy and move sources and the copy count, thereby protecting the copyright of content while ensuring the user's right of personal duplication of the content.

The examples of the above-mentioned embodiment of the invention are illustratively only. Various other system configurations, recorder configurations, and processing schemes are possible. For example, as described, when CC="001", content cannot be moved from a memory card in the above mentioned examples. However, the conditions of permitting or inhibiting may be set otherwise by permitting the moving of content if CC="001". As described, values of CC="100" or higher may be specified for indicating future content providers. In the present invention, various permission/prohibition conditions may be set according to the types of content providers. For example, for content of which CC values are "100" supplied through a transmission path, copying and moving of that content may be controlled in other manners than described above.

In the above examples, audio data content is assumed. It will be apparent that the present invention is also applicable to video data content. The invention is also applicable to text data and other data as well.

In the above examples, HDDs and memory cards are used for examples of mass storage recording media and small-size recording media. It will be apparent that the present invention is also applicable to controlling of content copying and moving operations between various other recording media such as optical disc, magneto-optical disc, magnetic disc, personal data players, and magnetic tape.

As mentioned above and according to the invention, identification information is recorded to various recording media along with the content data. The identification information distinguishes between content recorded in a recording medium of predetermined type that was directly transferred and recorded therein and content recorded in the recording medium of predetermined type after being recorded once in a mass storage recording medium before being transferred to the recording medium.

Further, this identification information identifies whether the recorded content has been copied or moved from a mass storage recording medium.

According to the recording apparatus and the recording and reproducing system according to the invention compatible with the recording medium according to the invention, copying or moving of content from a recording medium, which is a non-volatile memory for example, can be permitted or inhibited according to the type of a copy source, namely whether the copy source is a recording medium of a predetermined type or a mass storage recording medium. In addition, copying and moving of content from a recording medium can be permitted or inhibited according to whether the content has been copied or moved from a mass storage recording medium. Therefore, copying and moving of content from a recording medium can be permitted or inhibited properly depending on various predetermined circumstances.

To be more specific, if content recorded in a content recorded area in a recording medium is found, in accordance with corresponding identification information, to have been copied from a mass storage recording medium, only the moving of this content back to the mass storage recording medium from which the content has been copied is permitted, thereby disabling all other copying and moving operations. Moreover, if content has been directly transferred from a recording medium of predetermined type to a mass storage recording medium, namely if the same content exists on both the recording medium of predetermined type and the mass storage recording medium, the identification information of this content is updated to a value equivalent to the case in which the content has been transferred from the mass storage recording medium to the recording medium of predetermined type, thereby inhibiting further copying and moving operations.

In addition, for the content recorded on a mass storage recording medium, a copy permission count controller for controlling the number of times content can be copied to a recording medium appropriately controls the copying of such content from the mass storage recording medium to a recording medium.

Consequently, the present invention is advantageous in that the protection of copyright of content is realized while maintaining the user right of copying the content for personal use.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A storage medium, comprising:
   a data area for storing data; and
   a management area for storing management data corresponding to data stored in said data area;
   wherein said management data stored in said management area comprises identification information identifying a route followed by said data stored in said data area in arriving in said data area, and whether or not said data stored in said data area has been transferred from an original source and stored once in another storage medium before being transferred from the another storage medium to, and stored in said data area.

2. The storage medium of claim 1, wherein said identification information identifies whether or not data stored in said other storage medium is substantially deleted when data stored in said other storage medium is transferred to and stored in said data area.

3. The storage medium of claim 1, wherein said identification information identifies whether or not data stored in said data area has been transferred from an original source and stored once in a mass storage medium before being transferred to and stored in said data area.

4. The storage medium of claim 3, wherein said identification information identifies whether or not data stored in said mass storage medium is substantially deleted when data stored in said mass storage medium is transferred to and stored in said data area.

5. The storage medium of claim 3, wherein said mass storage medium comprises a hard disc.

6. The storage medium of claim 1, wherein said identification information identifies whether data stored in said data area has been copied or moved from another storage medium.

7. The storage medium of claim 1, wherein said storage medium comprises a non-volatile memory.

8. An apparatus for writing data in a storage medium, said storage medium comprising a data area for storing data and a management area for storing management data corresponding to data stored in said data area, comprising:
   a data recorder for writing a received data into said data area; and
   an identification information recorder for recording identification information into said management area, said identification information identifying a route followed by said data written to said data area in arriving in said data area, and whether or not said data stored in said data area has been transferred from an original source and stored once in another storable medium before being transferred from the another storage medium to, and stored in said data area.

9. The apparatus of claim 8, wherein said identification information identifies whether or not data written in said other storage medium is substantially deleted when data stored in said other storage medium is transferred to and written in said data area.

10. The apparatus of claim 8, wherein said identification information identifies whether or not data written in said data area has been transferred from an original source and stored once in a mass storage medium before being transferred to and written in said data area.

11. The apparatus of claim 10, wherein said identification information identifies whether or not data written in said mass storage medium is substantially deleted when data stored in said mass storage medium is transferred to and written in said data area.

12. The apparatus of claim 10, wherein said mass storage medium comprises a hard disc.

13. The apparatus of claim 8, wherein said identification information identifies whether data written in said data area has been copied or moved from another storage medium.

14. The apparatus of claim 8, wherein said storage medium comprises a non-volatile memory.

15. The apparatus of claim 8, further comprising a controller for controlling the transfer of data written in said data area to an external device in accordance with said identification information.

16. The apparatus of claim 8, further comprising a controller for controlling the transfer of data written in said data area to a mass storage device in accordance with said identification information.

17. The apparatus of claim 16, wherein the transfer of data is a copy operation.

18. The apparatus of claim 17, further comprising an identification information updating recorder for updating said identification information written in said management area when said identification information identifies an original data source as a source of said data written in said data area, and when said data written in said data area is copied onto said mass storage medium, wherein said controller updates said identification information to a value identifying as if the data has been transferred from said mass storage medium and written in said data area.

19. The apparatus of claim 16, wherein the transfer of data is a move operation.

20. The apparatus of claim 19, wherein said controller prohibits the movement of data from said data area to said mass storage medium when the source of the data written in said data area is an original data source.

21. The apparatus of claim 19, wherein said controller permits the movement of data from said data area to said mass storage medium when said data in said data area has been moved from another mass storage medium.

22. The apparatus of claim 19, wherein said controller permits the movement of data from said data area to said mass storage medium when the data written in said data area has previously been transferred from said mass storage medium.

23. A system for recording data, comprising:
a first recording/reproducing apparatus adapted to write data to and reproduce data from a first storage medium comprising a data area for storing data therein, and a management area for storing management data corresponding to data stored in said data area, and a second recording/reproducing apparatus adapted to write data to and reproduce data from a second storage medium comprising a data area for storing data therein, and a management area for storing management data corresponding to data stored in said data area, each of said first and second recording/reproducing apparatuses comprising:
an identification information recorder for recording identification information into said management area, said identification information identifying a route followed by said data written to said data area in arriving in said data area, and whether or not said data stored in said data area has been transferred from an original source and stored once in another storage medium before being transferred from the another storage medium to, and stored in said data area; and
a controller for controlling the transfer of data written in said data area of one of said first and second storage media to said data area of said other of said first and second storage media in accordance with said identification information.

24. The system of claim 23, wherein said controller of one of said first and second recording/reproducing apparatuses controls said of one of said first and second recording/reproducing apparatuses to transfer said data written in said data area of said one of said first and second storage media to a mass storage medium in accordance with said identification information of said one of said first and second storage.

25. The system of claim 23, wherein said controller of one of said first and second recording/reproducing apparatuses controls said of one of said first and second recording/reproducing apparatuses to copy said data written in said data area of said one of said first and second storage media to said data area of the other of said first and second recording/reproducing apparatuses in accordance with said identification information of said one of said first and second storage.

26. The system of claim 25, further comprising an identification information updating recorder for updating said identification information written in said management area of said one of said first and second storage media when said identification information of said one of said first and second storage media identifies an original data source as a source of said data written in said data area of said one of said first and second storage media, and when said data written in said data area of said one of said first and second storage media is copied onto said data area of said other of said first and second storage medium, wherein said controller of said one of said first and second recording/reproducing apparatuses updates said identification information of said one of said first and second storage media to a value identifying as if the data has been transferred from said mass storage medium and written in said data area of said one of said first and second storage media.

27. The system of claim 23, wherein said controller of one of said first and second recording/reproducing apparatuses controls said of one of said first and second recording/reproducing apparatuses to move said data written in said data area of said one of said first and second storage media to said data area of the other of said first and second recording/reproducing apparatuses in accordance with said identification information of said one of said first and second storage.

28. The system of claim 27, wherein said controller of said one of said first and second recording/reproducing apparatuses inhibits the movement of said data written in said data area of said one of said first and second storage media to said data area of the other of said first and second storage media when the source of the data written in said data area of said one of said first and second storage media is an original data source.

29. The system of claim 27, wherein said controller of said one of said first and second recording/reproducing apparatuses permits the movement of said data written in said data area of said one of said first and second storage media to said data area of the other of said first and second storage media when the source of the data written in said data area of said one of said first and second storage media is another storage medium.

30. The system of claim 27, wherein said controller of said one of said first and second recording/reproducing apparatuses permits the movement of said data written in said data area of said one of said first and second storage media to said data area of the other of said first and second storage media when the data written in said data area of said one of said first and second storage media has been copied from said data area of said other of said first and second storage media.

31. The system of claim 23, wherein one of said first and second recording/reproducing apparatuses corresponding to said other of said storage media further comprises a copy controller for controlling the copying of data stored in said data area of said other of said first and second storage media to said data area of said one of said first and second storage media in accordance with a copy permission count.

32. The system of claim 31, wherein said copy controller sets said copy permission count to n−1 when said data stored in said data area of said other of said first and second storage media can be copied to said data area of said one of said first and second storage media, wherein n equals a maximum copy permission count and n−1 must be greater than or equal to zero.

33. The system of claim 31, wherein said copy controller sets said copy permission count to n+1 each time data stored in said data area of said one of said first and second storage media is moved to said data area of said other of said first and second storage media when the source of said data stored in said data area of said one of said first and second storage media is said data area of said other of said first and second storage media.

34. The system of claim 31, wherein said copy controller sets said copy permission count to n−1 each time data stored in said data area of said other of said first and second storage media is copied to said data area of said one of said first and second storage media, wherein n equals a maximum copy permission count and n−1 must be greater than or equal to zero.

35. The system of claim 34, wherein when n−1 is less than zero, copying of data stored in said data area of said other of said first and second storage media to said data area of said one of said first and second storage media is prohibited.

36. A method for writing data in a storage medium, said storage medium comprising a data area for storing data and a management area for storing management data corresponding to data stored in said data area, comprising the steps of:

writing a received data into said data area; and recording identification information into said management area, said identification information identifying a route followed by said data written to said data area in arriving in said data area, and whether or not said data stored in said data area has been transferred from an original source and stored once in another storage medium before being transferred from the another storage medium to, and stored in said data area.

37. The method of claim 36, wherein said identification information identifies whether or not data written in said other storage medium is substantially deleted when data stored in said other storage medium is transferred to and written in said data area.

38. The apparatus of claim 36, wherein said identification information identifies whether or not data written in said data area has been transferred from an original source and stored once in a mass storage medium before being transferred to and written in said data area.

39. The apparatus of claim 38, wherein said identification information identifies whether or not data written in said mass storage medium is substantially deleted when data stored in said mass storage medium is transferred to and written in said data area.

40. The apparatus of claim 38, wherein said mass storage medium comprises a hard disc.

41. The apparatus of claim 36, wherein said identification information identifies whether data written in said data area has been copied or moved from another storage medium.

42. The apparatus of claim 36, wherein said storage medium comprises a non-volatile memory.

43. The apparatus of claim 36, further comprising the step of controlling the transfer of data written in said data area to an external device in accordance with said identification information.

44. The apparatus of claim 36, further comprising the step of controlling the transfer of data written in said data area to a mass storage device in accordance with said identification information.

45. The apparatus of claim 44, wherein the transfer of data is a copy operation.

46. The apparatus of claim 45, further comprising the step of updating said identification information written in said management area when said identification information identifies an original data source as a source of said data written in said data area, and when said data written in said data area is copied onto said mass storage medium, said identification information being updated to a value identifying as if the data has been transferred from said mass storage medium and written in said data area.

47. The apparatus of claim 44, wherein the transfer of data is a move operation.

48. The apparatus of claim 47, wherein the movement of data from said data area to said mass storage medium is prohibited when the source of the data written in said data area is an original data source.

49. The apparatus of claim 47, wherein the movement of data from said data area to said mass storage medium is permitted when said data in said data area has been moved from another mass storage medium.

50. The apparatus of claim 47, wherein the movement of data from said data area to said mass storage medium is permitted when the data written in said data area has previously been transferred from said mass storage medium.

51. A method for writing data to and reproducing data from a first storage medium comprising a data area for storing data therein, and a management area for storing management data corresponding to data stored in said data area, and a second storage medium comprising a data area for storing data therein, and a management area for storing management data corresponding to data stored in said data area, comprising the steps of:

recording identification information into said management area, said identification information identifying a route followed by said data written to said data area in arriving in said data area, and whether or not said data stored in said data area has been transferred from an original source and stored once in another storage medium before being transferred from the another storage medium to, and stored in said data area; and controlling the transfer of data written in said data area of one of said first and second storage media to said data area of said other of said first and second storage media in accordance with said identification information.

52. The method of claim 51, wherein the transfer of said data written in said data area of said one of said first and second storage media to a mass storage medium is controlled in accordance with said identification information of said one of said first and second storage media.

53. The method of claim 51, wherein said data written in said data area of said one of said first and second storage media is copied to said data area of the other of said first and second recording/reproducing apparatuses in accordance with said identification information of one of said first and second storage media.

54. The method of claim 53, further comprising the step of updating said identification information written in said management area of said one of said first and second storage media to a value identifying as if the data has been transferred from said other of said first and second storage media and written in said data area of said one of said first and second storage media when said data written in said data area of said one of said first and second storage media is copied onto said data area of said other of said first and second storage medium and when said identification information of said one of said first and second storage media identifies an original data source as a source of said data written in said data area of said one of said first and second storage media.

55. The method of claim 51, wherein said data written in said data area of said one of said first and second storage media is moved to said data area of the other of said first and second storage media in accordance with said identification information of said one of said first and second storage.

56. The method of claim 55, wherein the movement of said data written in said data area of said one of said first and second storage media is to said data area of the other of said first and second storage media is inhibited when the source of the data written in said data area of said one of said first and second storage media is an original data source.

57. The method of claim 55, wherein the movement of said data written in said data area of said one of said first and second storage media to said data area of the other of said first and second storage media is permitted when the source of the data written in said data area of said one of said first and second storage media is another storage medium.

58. The method of claim 55, wherein the movement of said data written in said data area of said one of said first and second storage media to said data area of the other of said first and second storage media is permitted when the data written in said data area of said one of said first and second storage media has been copied from said data area of said other of said first and second storage media.

59. The method of claim 51, wherein the copying of data stored in said data area of said other of said first and second storage media to said data area of said one of said first and second storage media is controlled in accordance with a copy permission count.

60. The method of claim 59, wherein said copy permission count is set to n−1 when said data stored in said data area of said other of said first and second storage media can be copied to said data area of said one of said first and second storage media, wherein n equals a maximum copy permission count and n−1 must be greater than or equal to zero.

61. The method of claim 59, wherein said copy permission count is set to n+1 each time data stored in said data area of said one of said first and second storage media is moved to said data area of said other of said first and second storage media when the source of said data stored in said data area of said one of said first and second storage media is said data area of said other of said first and second storage media.

62. The method of claim 59, wherein said copy permission count is set to n−1 each time data stored in said data area of said other of said first and second storage media is copied to said data area of said one of said first and second storage media, wherein n equals a maximum copy permission count and n−1 must be greater than or equal to zero.

63. The method of claim 62, wherein copying of data stored in said data area of said other of said first and second storage media to said data area of said one of said first and second storage media is prohibited when n−1 is less than zero.

* * * * *